(12) United States Patent
Spinelli et al.

(10) Patent No.: US 7,403,550 B1
(45) Date of Patent: Jul. 22, 2008

(54) QUASI-CW UV LASER WITH LOW PEAK PULSE-POWER

(75) Inventors: Luis A. Spinelli, Sunnyvale, CA (US); Sergei V. Govorkov, Los Altos, CA (US); R. Russel Austin, Cool, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 11/715,630

(22) Filed: Mar. 8, 2007

(51) Int. Cl.
*H01S 3/10* (2006.01)
*H01S 3/13* (2006.01)
(52) U.S. Cl. .......................... 372/25; 372/30; 372/700
(58) Field of Classification Search ................ 372/25, 372/30, 700; 359/331
See application file for complete search history.

(56) References Cited

U.S. PATENT DOCUMENTS

| 5,448,417 | A | * | 9/1995 | Adams | 359/856 |
| 5,993,904 | A | | 11/1999 | Boucher | 427/248.1 |
| 6,275,514 | B1 | | 8/2001 | Katzir et al. | 372/25 |
| 6,535,531 | B1 | | 3/2003 | Smith et al. | 372/25 |
| 6,590,911 | B1 | | 7/2003 | Spinelli et al. | 372/22 |
| 6,967,977 | B2 | * | 11/2005 | Hasson | 372/30 |
| 7,035,012 | B2 | | 4/2006 | Govorkov et al. | 359/618 |
| 7,130,321 | B2 | | 10/2006 | Spinelli et al. | 372/22 |
| 2006/0216037 | A1 | | 9/2006 | Wiessner et al. | 398/161 |

* cited by examiner

*Primary Examiner*—Armando Rodriguez
(74) *Attorney, Agent, or Firm*—Stallman & Pollock LLP

(57) ABSTRACT

An in vivo screening assay for identifying an agent that interferes with T cell activation and/or -differentiation and/or modulation of other inflammatory effector cells.

30 Claims, 14 Drawing Sheets

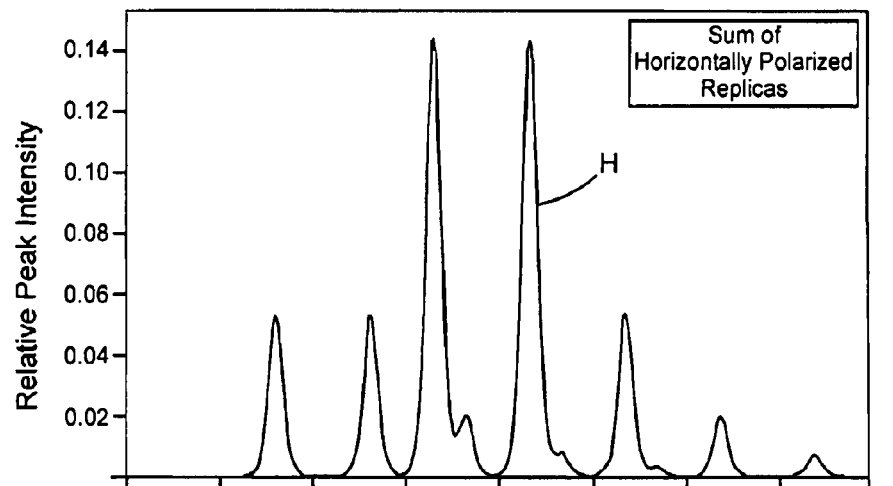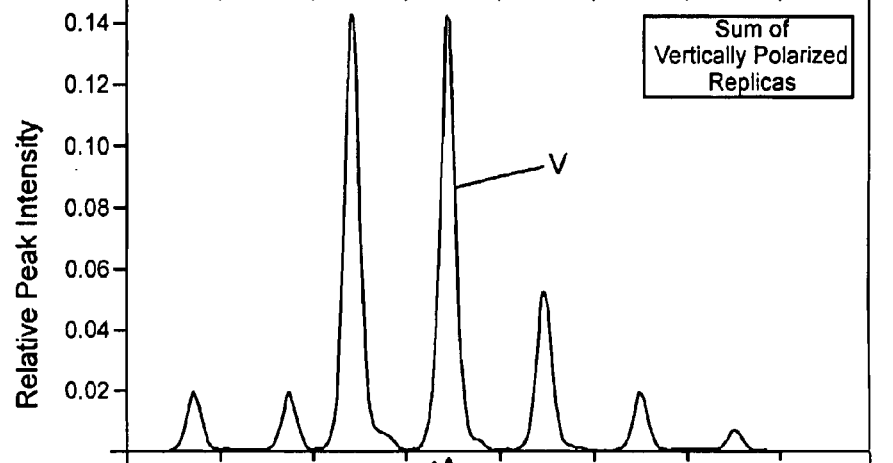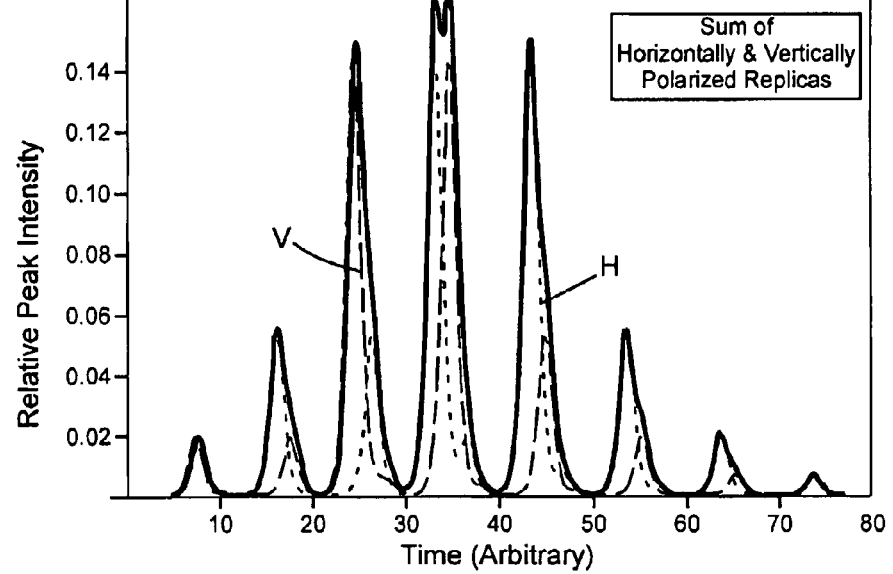

QUASI-CW UV LASER WITH LOW PEAK PULSE-POWER

TECHNICAL FIELD OF THE INVENTION

The present invention relates in general to mode-locked lasers. The invention relates in particular to quasi-continuous-wave laser apparatus including a mode-locked laser delivering fundamental radiation that is externally frequency-converted by one or more optically nonlinear crystals

DISCUSSION OF BACKGROUND ART

Continuous wave (CW) and quasi-CW UV lasers have been successfully utilized in microelectronic fabrication operations, for example, for inspection of wafers, microcircuits and masks. An advantage of using UV wavelengths is that a spatial resolution can be achieved that is comparable to the feature size of circuits. A CW laser is preferable, as such a laser provides the highest average power, power which is necessary for high throughput of the operation, while exposing a sample being operated on to the lowest possible peak intensity. The lower peak intensity is desirable in order to reduce damage to the sample during the operation.

CW UV lasers having adequate average power (several Watts) are not commercially available. There are commercial UV lasers available that involve frequency converting the output of a so-called quasi-CW laser. Such a laser is a pulsed laser that operates at a very high pulse-repetition frequency (PRF), for example, greater than about 10 megahertz (MHz) and typically 50 or more MHz. The pulse repetition frequency can be sufficiently high that, in certain operations on certain targets, the pulsed radiation beam from such a laser can be regarded as a continuous beam. Lasers including neodymium (Nd) doped host crystals, in particular yttrium vanadate ($YVO_4$) or yttrium aluminum garnet (YAG) can be operated, mode-locked, at a PRF between 70 MHz and 120 MHz, with a pulse-duration of between about 10 and several 100 picoseconds. Such lasers have a fundamental output-wavelength of about 1064 nanometers (nm). This wavelength can be tripled, quadrupled, or quintupled by optically nonlinear crystals to provide, respectively, third-harmonic, fourth-harmonic, or fifth-harmonic, radiation, all of which are at UV-wavelengths. Having short (picosecond) pulses with relatively high peak-power facilitates frequency conversion into the UV range. By way of example, a Paladin™ (frequency-tripled Nd:$YVO_4$) model laser available from Coherent®, Inc. of Santa Clara, Calif., the assignee of the present invention, can provide, at a wavelength of 355 nm (the third-harmonic wavelength), an average power as high as about 8 Watts (W) at a PRF of about 80 MHz. Pulse-duration (FWHM) is about 15 picoseconds.

While a relatively high peak-power of fundamental-wavelength pulses is advantageous for frequency (wavelength) conversion of the fundamental radiation, a relatively high power for UV-radiation pulses so produced can be disadvantageous for reasons discussed above. An increased average power for the UV radiation pulses, however, would be advantageous for increased operation throughput.

One approach to reducing peak-power in the UV radiation is to increase the PRF of the frequency-converted pulses by using a pulse-dividing arrangement to divide an original pulsed beam into two or more new pulsed beams, temporally separated by a submultiple (one-half, one-third, one-fourth, etc) of the repetition period of the original pulsed beam, then recombine these new beams on a common path or on a target. The pulses in the recombined beam will have a fraction of the peak-power of pulses in the original beam but will be delivered at a higher (twice, three-times, four times) PRF than those in the original beam. The average power in the new beam will be the same as that in the original beam less any losses incurred in the dividing and recombining operations. Examples of this approach are described in U.S. Pat. No. 6,275,514. Pulses in such a recombined beam will also, however, have only a fraction of the energy of pulses in the original beam. This could be a problem in operations for which pulse energy must exceed a threshold value.

Another approach to reducing peak-power in pulses without significantly reducing energy in the pulses is to temporally "stretch" the pulses without effectively changing the pulse-repetition frequency. In this approach, an optical delay loop having a round-trip time on the order of the duration of the original pulse is used to divide an original pulse into a plurality of replica pulses temporally spaced apart, peak to peak, by about one or two pulse-durations of the original pulse. These replicas of the original pulse are recombined on a target or along a common path as discussed above. The close temporal spacing of the replica pulses provides that the effect of the replica pulses in most operations is the same as a single pulse having an energy equal to the sum of the energy in the replica pulses. It is for this reason that the combination of the replica pulses is usually referred to in the prior-art as a stretched pulse.

This pulse-stretching approach is commonly used to reduce peak-power in UV radiation pulses delivered by excimer lasers. Such pulses have a duration of between about 20 nanoseconds (ns) and 80 ns and are usually delivered at a PRF between 100 Hertz (Hz) and 5 kilohertz (kHz). Examples of this approach to stretching excimer-laser pulses are taught in U.S. Patent Publication No. 2006/0216037 and in U.S. Pat. No. 7,035,012, which are assigned to the assignee of the present invention. Examples are also taught in U.S. Pat. No. 6,535,531. Imaging delay loops described in these documents have a round-trip length of about 6 meters or greater, depending on the duration of pulses being stretched. In most examples described, reflective imaging optics "fold" the delay loops into a space having a length as short about one-fourth of the round-trip length Mode-locked lasers described above, however, provide pulses having a duration of only several picoseconds. A delay line in accordance with the teachings of the above-reference documents, for a 15-picosecond pulse, would be required to have a length of only about 4.5 millimeters. Making and aligning components for an imaging delay line of this short length is impractical. Accordingly, there is a need for a different approach to stretching multi-picosecond pulses from frequency-converted mode-locked lasers.

SUMMARY OF THE INVENTION

The present invention is directed to laser apparatus for providing quasi-CW harmonic-wavelength pulses of relatively high average power and relatively low peak power. In one aspect, apparatus in accordance with the present invention comprises a laser source providing optical pulses having a first wavelength and being temporally equispaced by a pulse-repetition period $\tau$ and delivered at a pulse-repetition frequency (PRF) equal to $1/\tau$. An optical delay loop is arranged to receive the first-wavelength optical pulses and divide each thereof into a plurality of replicas thereof with the replicas of each pulse being temporally spaced apart by $\tau/N \pm \Delta\tau$, where N is an integer equal to or greater than 1 and $\Delta\tau$ is a about equal to or greater than the pulse-duration of the first-wavelength optical pulses. The optical delay loop is further arranged to deliver bursts of the pulse-replicas at a burst-repetition frequency equal to the PRF of the optical pulses multiplied by N, with each burst including replicas of different ones of the first-wavelength optical pulses.

In a preferred embodiment of apparatus in accordance with the present invention, the optical delay loop is the first of two optical delay loops and is arranged with N equal to 2 such that the bursts of pulse-replicas are delivered at a burst-repetition frequency equal to twice the PRF of the first-wavelength optical pulses. The second optical delay loop is arranged to receive replica-bursts from the first optical delay loop and arranged to divide each of the replica-bursts into a plurality of replicas thereof with the replicas of each replica-burst being temporally spaced apart by $\tau/4 \pm a\Delta\tau$. This provides that the second optical delay loop delivers sequences of burst-replicas at a sequence-repetition frequency equal to four times the PRF of the first-wavelength optical pulses. The first and second optical delay loops can be arranged such that the sequences of burst-replicas have about equal energy.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIGS. 9B-D are graphs schematically illustrating computed relative intensity as a function of time in a burst of replicas of hypothetical sech-squared pulses from the second pulse-stretcher of the apparatus of FIG. 7A wherein the first pulse-stretcher has a delay loop similar to the delay loop of FIG. 2 and the second pulse-stretcher has a delay loop similar to the delay loop of FIG. 7B, and wherein the first pulse-stretcher has a round-trip time equal to a pulse-repetition period of the harmonic-wavelength pulses plus six-times the pulse-duration of the harmonic-wavelength pulses, and the second pulse-stretcher has a round-trip time equal to a pulse-repetition period of the harmonic-wavelength pulses minus five-times the pulse-duration of the harmonic-wavelength pulses.

DETAILED DESCRIPTION OF THE INVENTION

Figure 1:
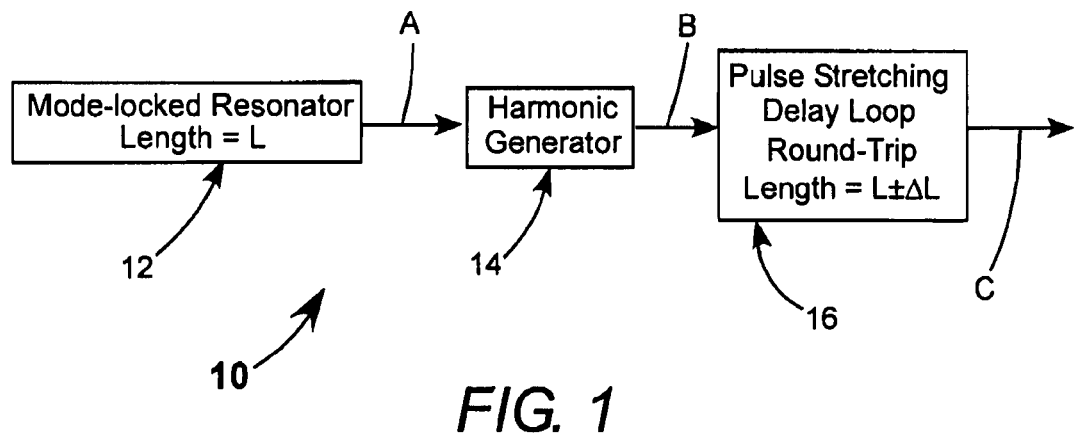
FIG. 1 schematically illustrates one preferred embodiment of laser apparatus in accordance with the present invention, including a mode-locked resonator having a resonator length and delivering optical pulses having a fundamental wavelength at a pulse-repetition period, a harmonic generator for converting the fundamental-wavelength pulses delivered by the laser-resonator to harmonic-wavelength pulses and a pulse-stretcher including an optical delay loop having a round-trip length fractionally different from twice the resonator length.

Referring now to the drawings, wherein like components are designated by like reference numerals, FIG. 1 schematically illustrates one preferred embodiment 10 of laser apparatus in accordance with the present invention. Apparatus 10 includes a mode-locked resonator 12 having a resonator (cavity) length L. It is emphasized that the length L, as defined here, is the round-trip length of the resonator, i.e., in a linear resonator having first and second end-mirrors, L is twice the distance from the first end-mirror to the second end-mirror. Length L is an optical round-trip length of the resonator and includes the effect of refractive index of a gain-medium (also not shown) and any other refractive optical elements therein.

Mode-locked resonator 12 delivers optical pulses having a fundamental wavelength at a pulse-repetition period τ. The pulse-repetition period is dependent on the optical length of the resonator and is equal to the round-trip time τ for fundamental radiation in the resonator, i.e., the round-trip length L divided by the speed of light. The pulse repetition frequency (PRF) of pulses delivered is, of course, 1/τ. The present invention is particularly useful when the PRF of the fundamental wavelength pulses is greater than about 10 MHz and the pulse-duration of the fundamental wavelength optical pulses is less than about 100 picoseconds.

In one example of the above-discussed Paladin™ laser, the PRF of the resonator is about 80 MHz, i.e., τ is about 12.5 nanoseconds (ns). The pulse-duration (FWHM) is about 15 picoseconds, i.e., τ is about 830 times the pulse-duration. As noted above, this laser generates pulses of third-harmonic (3H) radiation having a wavelength of about 355 nm from fundamental-wavelength pulses having a wavelength of about 1064 nm. For convenience of description, reference is made to this laser further in this description, but this should not be construed as limiting the invention to the particular structure or parameters of this mode-locked laser.

In apparatus 10, pulses of fundamental-wavelength radiation from resonator 12 are delivered to a harmonic generator 14 along path A. The harmonic generator converts the fundamental-wavelength pulses delivered by the laser-resonator to harmonic-wavelength pulses. Harmonic generator 14 may include only one optically nonlinear crystal arranged to generate pulses of second-harmonic radiation, or two or more optically nonlinear crystals arranged to generate pulses of third or higher harmonic-wavelength radiation as is known in the art.

Harmonic-radiation pulses from harmonic generator 10 are delivered along path B to a pulse stretching delay loop (pulse-stretcher) 16 in accordance with the present invention.

An inventive aspect of this pulse-stretcher is that the delay loop thereof has as round-trip of L±ΔL, where ΔL is a relatively small fraction, for example, less than about one-hundredth of round-trip length L. In other words, the delay loop of stretcher 16 preferably has a round-trip delay time of τ±Δτ, where Δτ is on the order of a few pulse-durations, i.e., the round-trip delay time is fractionally greater than or less than a pulse-repetition period. A pulse-repetition period of 12.5 ns corresponds to a delay loop round-trip length of about 3.75 meters and a resonator length of about 1.875 meters. Prior-art pulse-stretchers of the type described in above referenced U.S. Pat. No. 7,035,012 have a delay time per round-trip that is only between one-half and a few pulse-durations.

Figure 2:
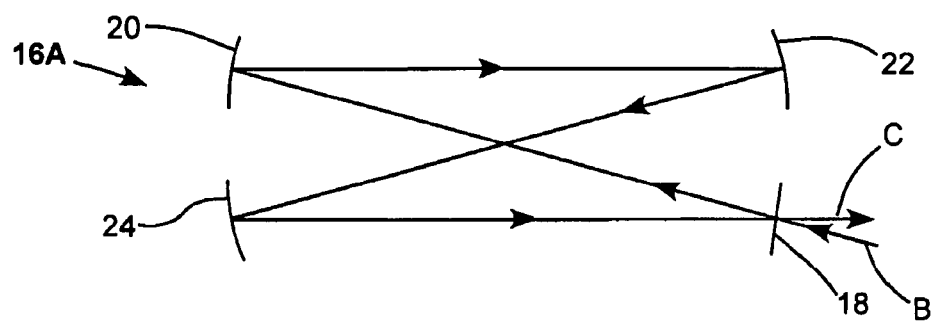
FIG. 2 schematically illustrates one example of an optical delay loop of the apparatus of FIG. 1, including three concave mirrors and a plane beamsplitter arranged and aligned to divide the harmonic-wavelength pulses into a plurality of temporally spaced-apart replicas following a common path in the delay loop and to recombine replicas of different ones of the harmonic-wavelength pulses along a common path in bursts thereof having a burst-duration much less than the pulse-repetition period of the mode-locked laser.

FIG. 2 schematically illustrates one example of an optical delay loop 16A suitable for use in the apparatus of FIG. 1. Delay loop 16A includes a beamsplitter 18 that is partially reflective and partially transmissive for the wavelength of harmonic-wavelength pulses generated by the harmonic generator of apparatus 10. Each of the harmonic-wavelength pulses is incident on beamsplitter 18, which reflects a portion (the first or prompt replica) of the pulse along path C and transmits the remainder of the pulse into the delay loop. In the delay loop, the remainder of the pulse is incident sequentially on concave mirrors 20, 22, and 24, which are preferably configured to image the remainder of the pulse 1:1, and preferably in the same orientation, back onto the beamsplitter at the original point of incidence. A portion of the remainder of the pulse is transmitted through the beamsplitter along path C as a second replica of the pulse and the remainder of that remainder goes around the delay loop again to provide third fourth, fifth etc. replicas until the pulse-replicas become vanishingly small and there is essentially nothing remaining of the pulse in the delay loop.

Relay imaging in delay loop 16A is at unit magnification (1:1) when mirrors 20 and 24 have the same focal length. Mirrors 20, 22, 24, and beamsplitter 18 are preferably separated by a distance approximately equal to $f_1+2f_2$. Where $f_1$ is the focal length of mirrors 20 and 24, and $f_2$ is the focal length of mirror 22. This ensures that a source in the plane of beamsplitter 18 is relay imaged onto the same plane after a complete roundtrip in delay loop 16A. Preferably $f_1$ is about equal to $2f_2$. This provides that the size of a circulating pulse (pulse-beam) is the same on all three mirrors and beamsplitter 18, and that focal points (waists) of the beam are located about mid-way between mirrors 20 and 22, and between mirrors 24 and 22.

The first replica of the pulse will have a relative (to the original pulse) peak-intensity (relative peak-power) R, where R is the reflectivity of the beamsplitter at the harmonic wavelength. The remaining (transmitted) replicas will have a relative power P(n) that can be approximated by an equation:

$$P(n)=(1-A)^{n-1}(1-R)^2 R^{n-2} \quad (1)$$

where A is the round-trip loss from scatter, absorption and the like, and n is the replica-number 2, 3, 4, and so forth. It can be determined from equation (1) that, in this loop configuration, the lowest peak relative power in a set (burst) of replicas of any one pulse will be obtained when the first and second replicas thereof have equal peak-power. The value of R required to establish this condition can be approximated by an equation:

$$R = \frac{2A - 3 + \sqrt{5-4A}}{2(A-1)} \quad (2)$$

By way of example, for a round-trip loss A of 0.02 R will be about 37.85%.

It can also be determined that whatever the peak-power of the first and second replicas, the third replica will have a peak-power less than either the first and second replicas. It can further be determined that the fourth and higher replicas will have a lower peak-power than the forgoing replica; and more than 99% of the maximum pulse energy obtainable, i.e., after round-trip losses, is contained in the first six replicas of any pulse. All pulse-replicas of any one pulse that are delivered by a delay loop are temporally spaced apart by $\tau \pm \Delta\tau$.

Figure 3:
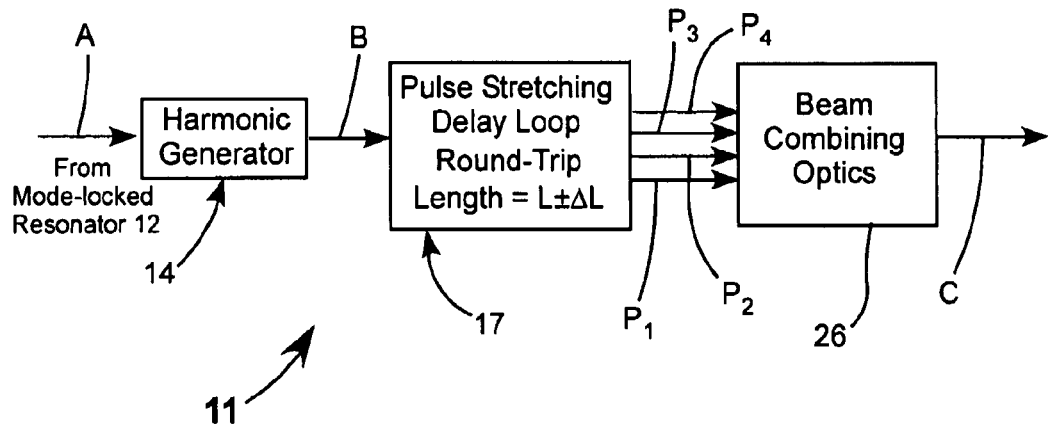
FIG. 3 schematically illustrates another preferred embodiment of laser apparatus in accordance with the present invention, similar to the apparatus of FIG. 1, but wherein the delay loop delivers the pulse-replicas along different paths and the apparatus further includes beam-combining optics for recombining the pulse-replicas on a common path or on a target.

FIG. 3 schematically illustrates another preferred embodiment 11 of laser apparatus in accordance with the present invention similar to apparatus 10 of FIG. 1 but wherein the delay loop 16 of apparatus 10 is replaced by a delay loop 17 that delivers a predetermined number (here four) of replicas of each pulse, with each replica delivered along a different path. The four paths are designated $P_1$, $P_2$, $P_3$, and $P_4$. Beam-combining optics 26 combine the replicas along a common path C as illustrated. Alternatively, beam-combining optics can be provided that focus the different replica paths at a common point on a target to which the replicas are being delivered. Various forms of beam-combining optics are known in the art to which the present invention pertains. As a detailed description of any such beam-combining optics is not necessary for understanding principles of the present invention, no such detailed description is presented herein.

Figure 4:
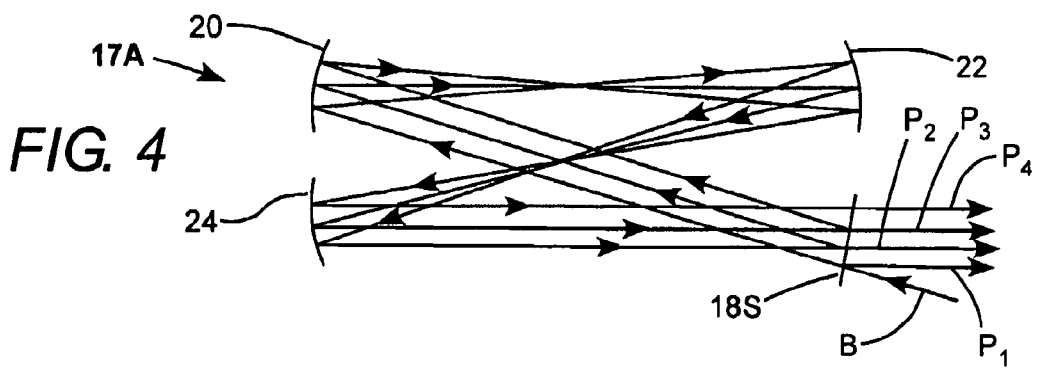
FIG. 4 schematically illustrates one example of an optical delay loop of the apparatus of FIG. 3, similar to the delay loop of FIG. 2, but wherein the three concave mirrors and the plane beamsplitter are misaligned such that the temporally spaced apart replicas follow different paths in the delay loop and exit the delay loop along different paths.

FIG. 4 depicts one example 17A of delay-loop 17. Delay loop 17A is similar to delay loop 16A of FIG. 2 with an exception that the beamsplitter and mirrors of the loop are misaligned from the alignment of FIG. 2 such that, after a first round trip in the loop, the remainder of the pulse is incident on the beamsplitter at a point thereon spaced apart from the point of entry. After a second and third round trips in the loop the remainder of the remainder of the pulse, and the remainder of the remainder of the remainder of the pulse, are incident on the beamsplitter at other spaced-apart points.

Figure 4A:
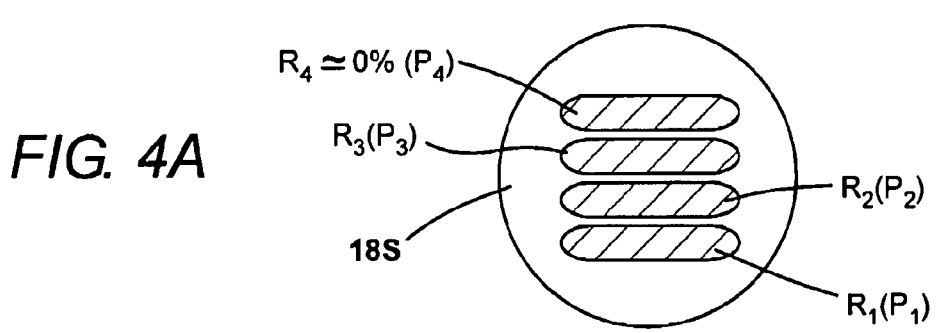
FIG. 4A schematically illustrates an example of the plane beamsplitter in the delay loop of FIG. 4, the beamsplitter having zones of different reflectivity thereon corresponding to the different replica-paths in the delay loop.

Another exception is that beamsplitter 18 of loop 16A is replaced in loop 17A by a beamsplitter 18S, the reflectivity (and transmission) of which is graded or stepped over the beamsplitter such that reflectivity thereof is dependent on the location thereon of incident radiation. FIG. 4A schematically illustrates one example of reflective zones $R_1$, $R_2$, $R_3$, and $R_4$ on a beamsplitter 18S corresponding to the location thereon of paths $P_1$, $P_2$, $P_3$, and $P_4$, respectively. The paths are spaced apart and about parallel to each other. The reflectivity $R_4$ at the point of incidence on beamsplitter 18S after the third round trip is made as close to zero as possible. Alternatively, the beamsplitter can be configured such that after the third round trip the remaining pulse energy bypasses the beamsplitter altogether.

An advantage of this type of loop is that the reflectivity-grading or reflectivity-stepping of the beamsplitter can be selected such that each replica of any one pulse has about the same peak-power. A disadvantage is that beam quality on target will usually be less than optimum due to the separation of the replica paths. Delay loop 17A is only one example of a loop that can provide a predetermined number of replicas along a corresponding number of separate paths. Others are described in above-referenced U.S. Pat. No. 7,035,012, the complete disclosure of which is hereby incorporated by reference. Any of these loops can be operated in an aligned form as an "infinite" loop, such as loop 16A, with all replicas leaving the loop on a common path.

Figure 5:
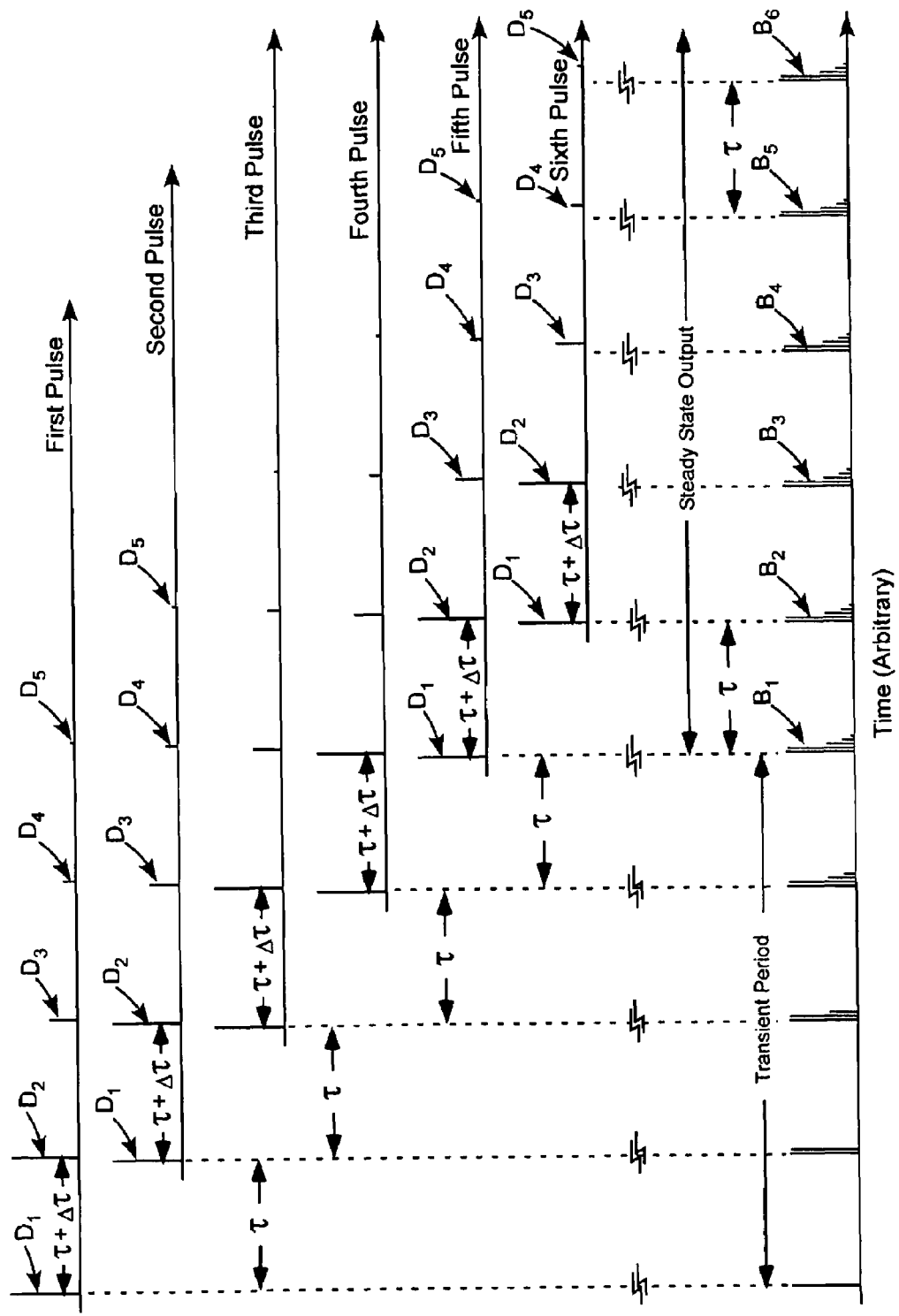
FIG. 5 is a timing diagram schematically illustrating division of harmonic-wavelength pulses into replicas thereof and recombination of replicas of different pulses into bursts thereof in a delay loop such as the delay loop of FIG. 2.

FIG. 5 is a timing diagram schematically illustrating division of harmonic-wavelength pulses into replicas thereof and recombination of replicas of different pulses into bursts thereof in a delay loop such as the delay loop of FIG. 2. The vertical axis in each line of the timing diagram is relative peak-power. The timing diagram is meant to represent operation of apparatus 10 immediately after the resonator begins to deliver pulses. The temporal development of replicas of the first through sixth pulses is depicted. Replicas $D_1$, $D_2$, $D_3$, $D_4$, and $D_5$ are depicted for each of the six pulses. Replicas D1 and D2 are assumed to have the same peak-power. In a delay loop 16A having a loss of 2% per round trip, this will occur when the reflectivity of beamsplitter 18 is about 37.9% and there is no second-surface reflection. Replicas $D_3$, $D_4$ and $D_5$ have progressively diminishing peak-power, and it is assumed that higher numbered replicas have a sufficiently low peak-power as to be negligible. By way of example for an input pulse of unit peak-power $D_1$, $D_2$, $D_3$, $D_4$, and $D_5$ will have relative peak values of about 0.379, 0.379, 0.140, 0.052, 0.019. The next replica would have a peak-power less than 1% of the input pulse. It is assumed that the round-trip delay in the resonator is $\tau \pm \Delta\tau$. Successive replicas of any one pulse are temporally spaced apart by this round-trip delay time. The first replica of any one pulse is temporally spaced apart from the first replica of an immediately previous pulse by the pulse-repetition period $\tau$.

It can be seen that there is a transient period of about 4 round-trip times until a burst $B_1$ of 5 replicas is output. The burst comprises, in time sequence, the first replica of the fifth pulse, the second replica of the fourth pulse, the third replica of the third pulse, the fourth replica of the second pulse, and the fifth replica of the first pulse, with the replicas spaced apart by $\Delta\tau$. Similar bursts will follow at intervals of $\tau$, i.e., the pulse-repetition period of pulses from the mode-locked resonator, with each burst comprising, in general, the sum of replicas $P_n(D_1)$, $P_{n-1}(D_2)$, $P_{n-2}(D_3)$, $P_{n-3}(D_4)$, $P_{n-4}(D_5)$ where Pn is the $n^{th}$ pulse, Pn–1 is the $(n-1)^{th}$ pulse and so forth.

It should be noted here that pulses from a mode-locked resonator are typically highly coherent, and replicas thereof will also be highly coherent. Accordingly, it is advisable to select a delay loop length such that $\Delta\tau$ is at least about one pulse-duration, and preferably at least two or three pulse-durations, to avoid optical interference between the pulse-replicas. With a replica separation of three pulse-durations, the effective burst-duration will be only about twelve pulse-durations, i.e., about 1.5% of a pulse-repetition period for 15-picosecond pulses at a PRF of 80 MHz. The term "effective", as used here, implies that the sixth and higher replicas of individual pulses have negligible contribution. The bursts of replicas will have an effect on a target of single, stretched pulses delivered at the PRF of the laser-resonator.

It should also be noted that if the length of the delay loop is selected such that the round-trip time therein is $\tau-\Delta\tau$, pulse-replicas in a burst will be in a temporal sequence that is the reverse of the sequence discussed above, i.e., $P_{n-4}(D_5)$, $P_{n-3}(D_4)$, $P_{n-2}(D_3)$, $P_{n-1}(D_2)$, and $P_n(D_1)$. This is not possible in a prior-art closed-loop pulse-stretcher wherein the round-trip time is on the order of a pulse-duration. Such a sequence can be used to "tailor" the energy-deposition temporal profile in pulse-bursts when two stretchers are "cascaded". Examples of this are presented further hereinbelow.

Figure 6:
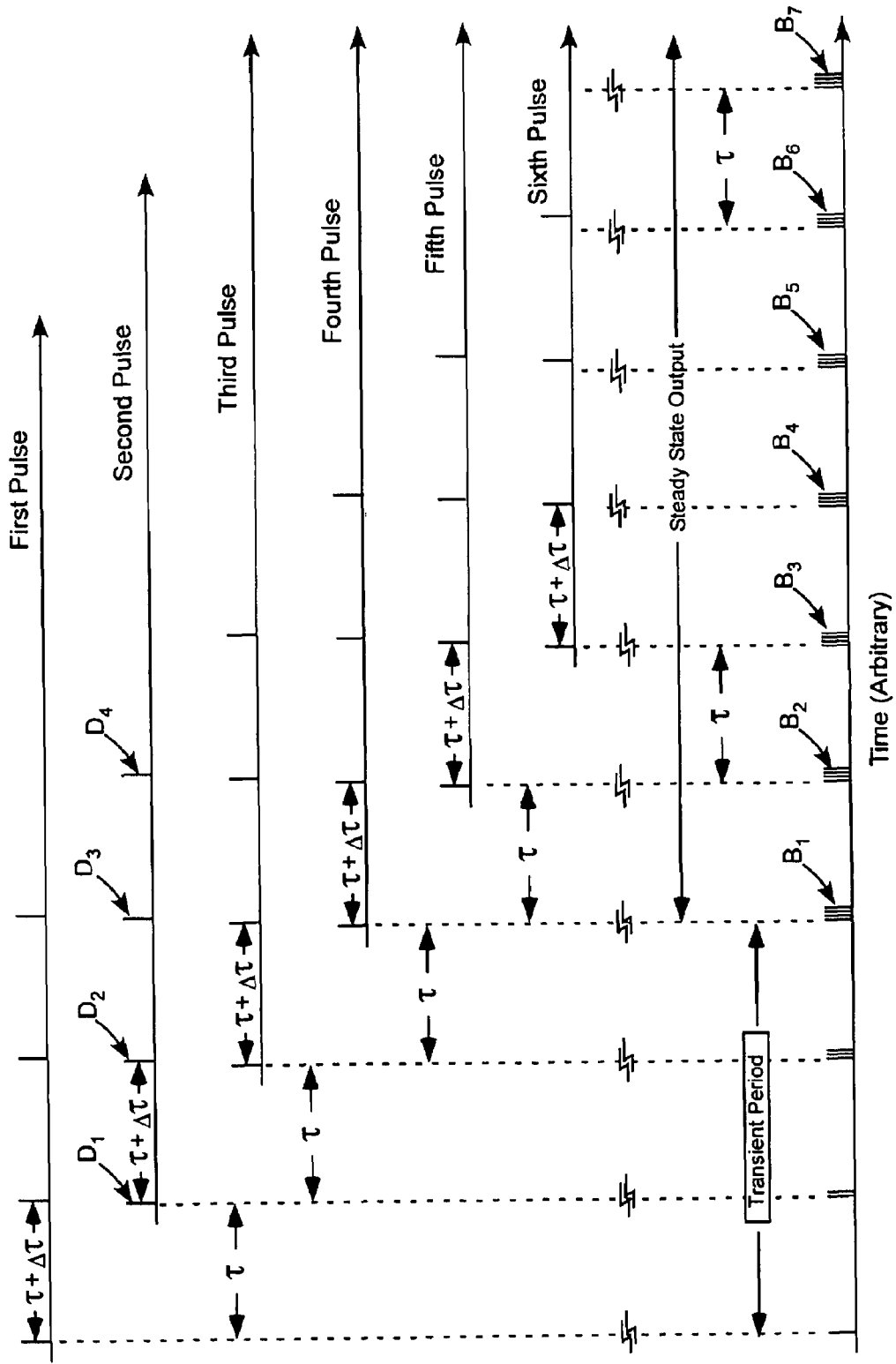
FIG. 6 is a timing diagram schematically illustrating division of harmonic-wavelength pulses into replicas thereof and recombination of replicas of different pulses into bursts thereof in a delay loop such as the delay loop of FIG. 4.

FIG. 6 is a timing diagram schematically illustrating division of harmonic-wavelength pulses into replicas thereof and recombination of replicas of different pulses into bursts thereof in a delay loop such as the delay loop of FIG. 4. In this example graded beamsplitter 18S of delay loop 17A (see FIG. 4) has been arranged such that only four replicas per pulse are created, all having the same peak-power. In this case, the temporal sequence of replicas in a burst is un-important. Whatever the temporal sequence, the energy deposition profile in a burst of replicas can be tailored by appropriate selection of stepped or graded reflectivity in the beamsplitter of the delay loop.

It is emphasized here that although the round-trip length of a delay loop in accordance with the present invention is only longer or shorter than that length required to provide a delay time equal to $\tau$ by a relatively small fraction, the fraction, in length units, is a few millimeters more or less than the round-trip length. This is very much greater than common manufacturing tolerances anticipated in constructing the loop or in variations in the loop length that might occur through environmental effects such as temperature variations or the like. In other words, the fractional difference is highly unlikely to occur by accident, and, in a properly constructed loop the length of the loop can be stabilized such that the fractional delay time $\Delta\tau$ does not vary significantly in normal use.

Figure 7:
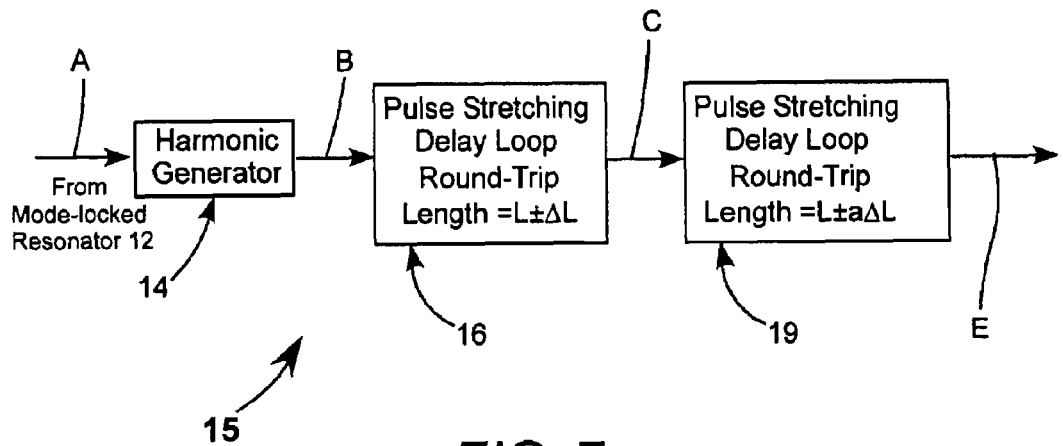
FIG. 7 schematically illustrates yet another preferred embodiment of laser apparatus in accordance with the present invention, similar to the apparatus of FIG. 1 but wherein bursts of pulses from the pulse-stretcher are delivered to a second pulse-stretcher having a round-trip length having a fractionally different length from twice the resonator length, the second pulse-stretcher arranged to divide first bursts of replica pulses from the first pulse-stretcher into a plurality of temporally spaced-apart replicas of the pulse-bursts following a common path in the delay loop and to recombine different ones of the first pulse-burst-replicas along a common path in second bursts thereof having a burst-duration much less than the pulse-repetition period of the mode-locked laser, but having more replicas per burst, and a burst-duration longer than that of the first pulse-bursts.

FIG. 7 schematically illustrates yet another preferred embodiment 15 of laser apparatus in accordance with the present invention similar to the apparatus of FIG. 1, but wherein bursts of pulses from pulse-stretcher 16 are delivered along common path C to a second pulse-stretcher 19 having a round-trip length fractionally different from the round-trip resonator length and different from the round-trip length in pulse-stretcher 16. Pulse-stretcher 19 is arranged to divide bursts of replica pulses from pulse-stretcher into a plurality of temporally spaced-apart replicas of the pulse-bursts following a common path in the delay loop and to recombine different ones of the first pulse-burst-replicas along a common path E. Pulse-stretcher 19 outputs burst of replicas with each of the bursts having more replicas per burst than the input bursts and a longer burst-duration than the input bursts.

Figure 8:
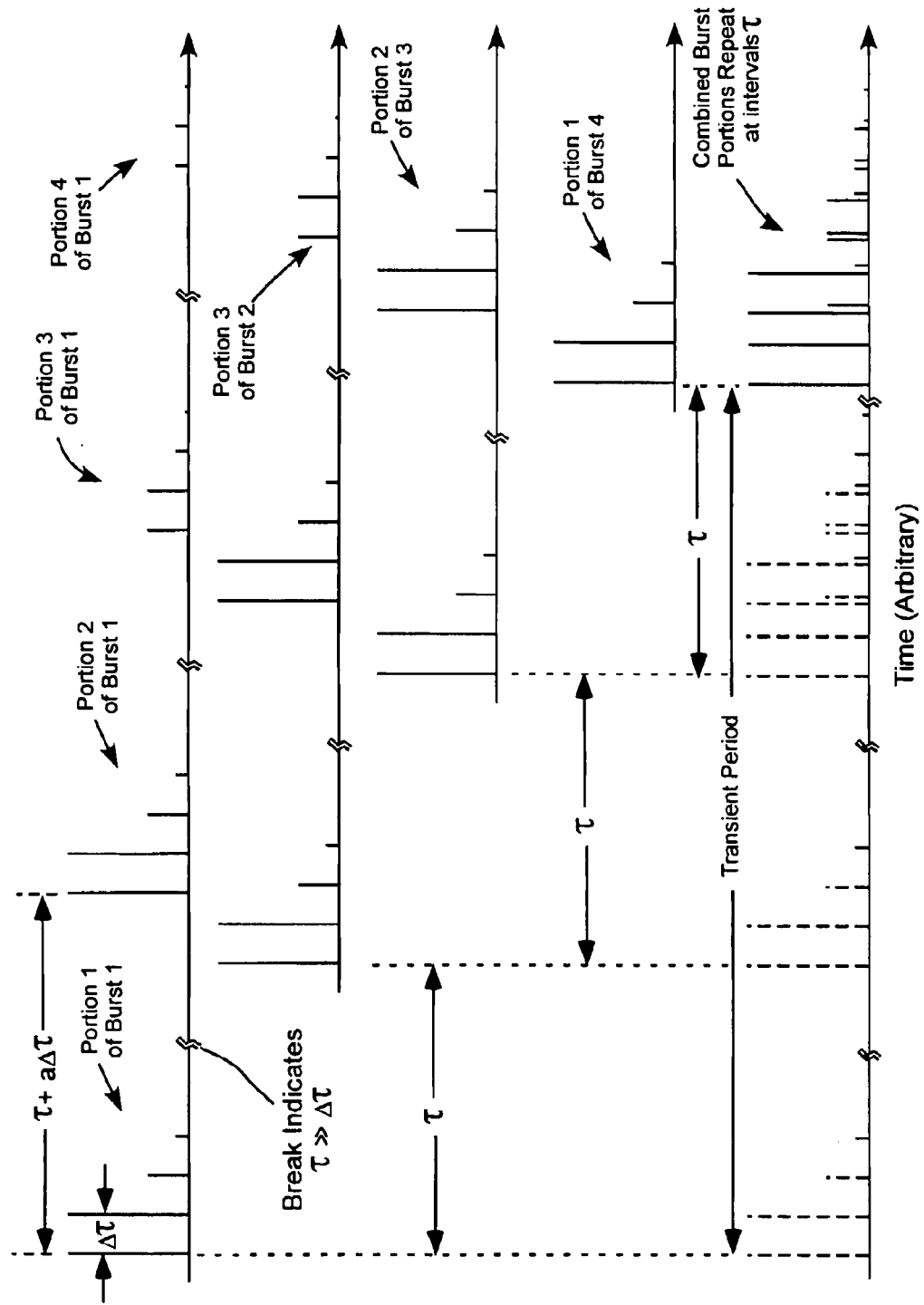
FIG. 8 is a timing diagram schematically illustrating division of bursts of harmonic-wavelength pulses into replicas thereof by an example of the second pulse-stretcher including a delay loop similar to the delay loop of FIG. 2, and recombination of replicas of different pulse-replica-bursts into longer bursts, with the first and second delay loops each have a round-trip length fractionally greater than twice the resonator-length of the mode-locked laser.

FIG. 8 is a timing diagram schematically illustrating division of bursts of harmonic-wavelength pulses into replicas thereof by an example of pulse-stretcher 19 including a delay loop similar to the delay loop of FIG. 2. In this example, the beamsplitter reflectivity of both pulse-stretchers is assumed to be that which will provide that the first two replicas of a pulse (in the case of first pulse-stretcher 16) or a burst thereof (in the case of first pulse-stretcher 19) have equal peak-power. Accordingly, the first two replica pulses in portions 1 and 2 of a first burst of pulse-replicas have a relative peak-power of about 0.143 with the first two replicas in subsequent portions scaling accordingly as depicted in the first line of FIG. 8.

The burst-portions are spaced apart by a time period $\tau+a\Delta\tau$, where a is selected (cooperative with the temporal spacing $\Delta\tau$ of replicas in a burst) according to a desired degree of temporal overlap of burst-portions at the output of pulse-stretcher 19, while still maintaining a preferred temporal spacing of at least two pulse-durations between any two replicas in the overlapping burst-portions. Here, after 4 pulse-bursts have been delivered into pulse-stretcher 19 from pulse-stretcher 16 (the first 4 lines of the timing diagram of FIG. 8) the output of pulse-stretcher 19 (the bottom line of the timing diagram of FIG. 8) will comprise, portion 1 of burst 4, portion 2 of burst three, portion 3 of burst two, and portion 4 of burst 1. The burst-portions are combined and temporally overlapped to form, in effect, a single burst of pulse-replicas. Similar combined burst-portions will be output from pulse-stretcher 19 at time intervals of $\tau$, i.e., at the PRF of the mode-locked laser.

The relative temporal position of replicas in a combined burst can be determined by tabling values of an expression:

$$x=(m-1)a+(n-1)b \quad (3)$$

for integer values 1 through m and 1 through n, where a and b are specified in pulse-durations, a is the separation of replicas in a burst and b is the separation of burst-portions in a combination thereof, n is the number of significant replicas in a burst and m is the number of significant burst-portions in a combination. Values of x in the table can be searched to make sure that there are no replicas too closely spaced according to whatever criterion is selected.

Figure 8A:
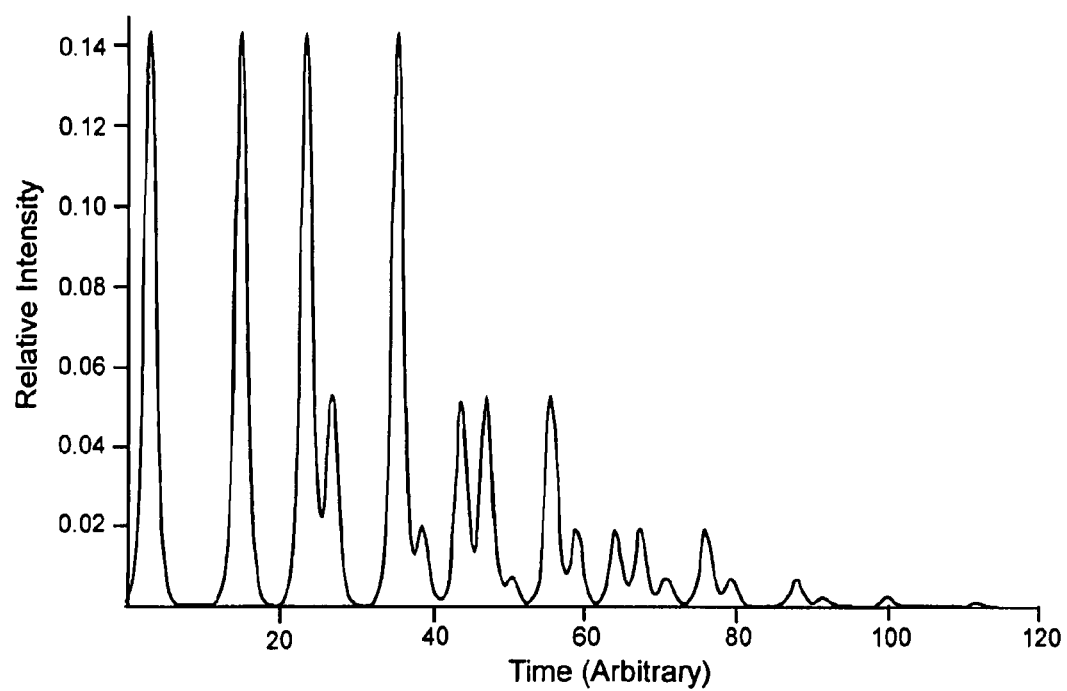
FIG. 8A is a graph schematically illustrating computed relative intensity as a function of time in a burst of replicas of hypothetical sech-squared pulses from the second pulse-stretcher of the apparatus of FIG. 8 wherein the first and second pulse-stretchers each have a delay loop similar to the delay loop of FIG. 2, and wherein the first pulse-stretcher has a round-trip time equal to a pulse-repetition period of the harmonic-wavelength pulses plus seven-times the pulse-duration of the harmonic-wavelength pulses, and the second pulse-stretcher has a round-trip time equal to a pulse-repetition period of the harmonic-wavelength pulses plus twelve-times the pulse-duration of the harmonic-wavelength pulses.

FIG. 8A is a graph schematically illustrating computed relative intensity as a function of time in a burst of replicas at the output of pulse-stretcher 19 with the following assumptions. The replicas are assumed to be "sech squared" pulses. The first pulse-stretcher is assumed to have a round-trip time equal to a pulse-repetition period of the harmonic-wavelength pulses plus seven-times the pulse-duration of the harmonic-wavelength pulses, and the second pulse-stretcher is assumed to have a round-trip time equal to a pulse-repetition period of the harmonic-wavelength pulses plus twelve-times the pulse-duration of the harmonic-wavelength pulses. The beamsplitter reflectivity in each pulse-stretcher is assumed to be 37.85% with round-trip losses of 2% in each pulse-stretcher. The sixth and higher replicas in a burst are neglected and the fifth and higher burst-portions are neglected. A pulse-duration is about 1.7 on the arbitrary time scale. No two pulse-replicas are spaced apart by less than about two pulse-durations.

Figure 8B:
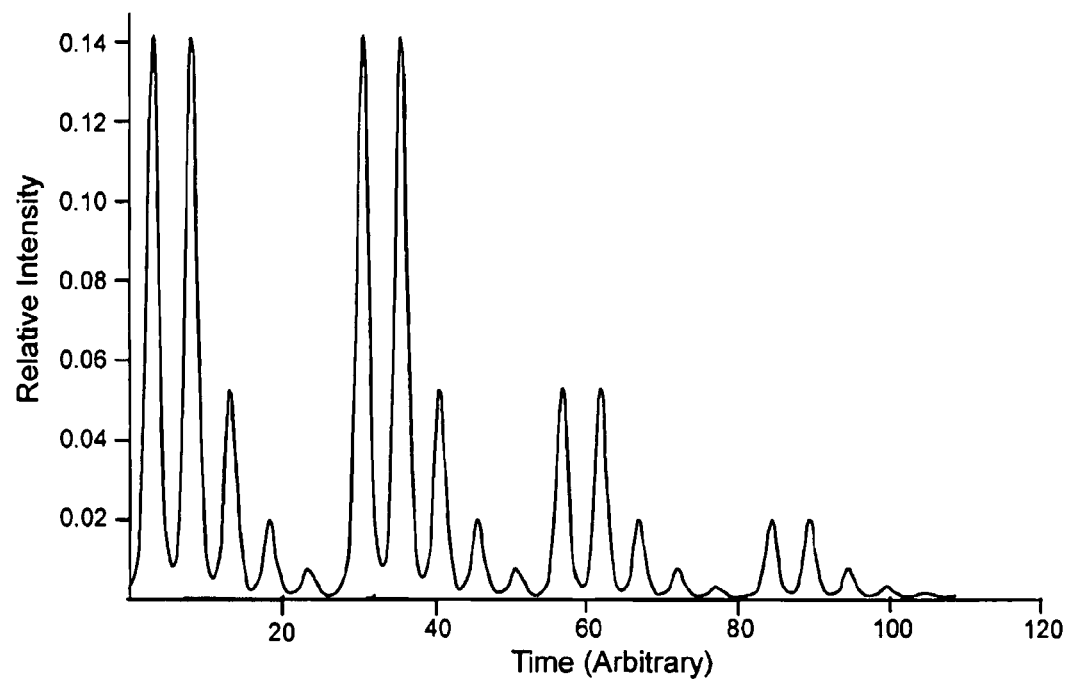
FIG. 8B is a graph schematically illustrating computed relative intensity as a function of time in a burst of replicas of hypothetical sech-squared pulses from the second pulse-stretcher of the apparatus of FIG. 8 wherein the first and second pulse-stretchers each have a delay loop similar to the delay loop of FIG. 2, and wherein the first pulse-stretcher has a round-trip time equal to a pulse-repetition period of the harmonic-wavelength pulses plus three-times the pulse-duration of the harmonic-wavelength pulses, and the second pulse-stretcher has a round-trip time equal to a pulse-repetition period of the harmonic-wavelength pulses plus sixteen-times the pulse-duration of the harmonic-wavelength pulses.

FIG. 8B is a graph schematically illustrating computed relative intensity as a function of time in a burst of replicas at the output of pulse-stretcher 19. Here assumptions are the same as for the graph of FIG. 8 with an exception that the first pulse-stretcher is assumed to have a round-trip time equal to a pulse-repetition period of the harmonic-wavelength pulses plus three-times the pulse-duration of the harmonic-wavelength pulses, and the second pulse-stretcher is assumed to have a round-trip time equal to a pulse-repetition period of the harmonic-wavelength pulses plus sixteen-times the pulse-duration of the harmonic-wavelength pulses.

Figure 9:
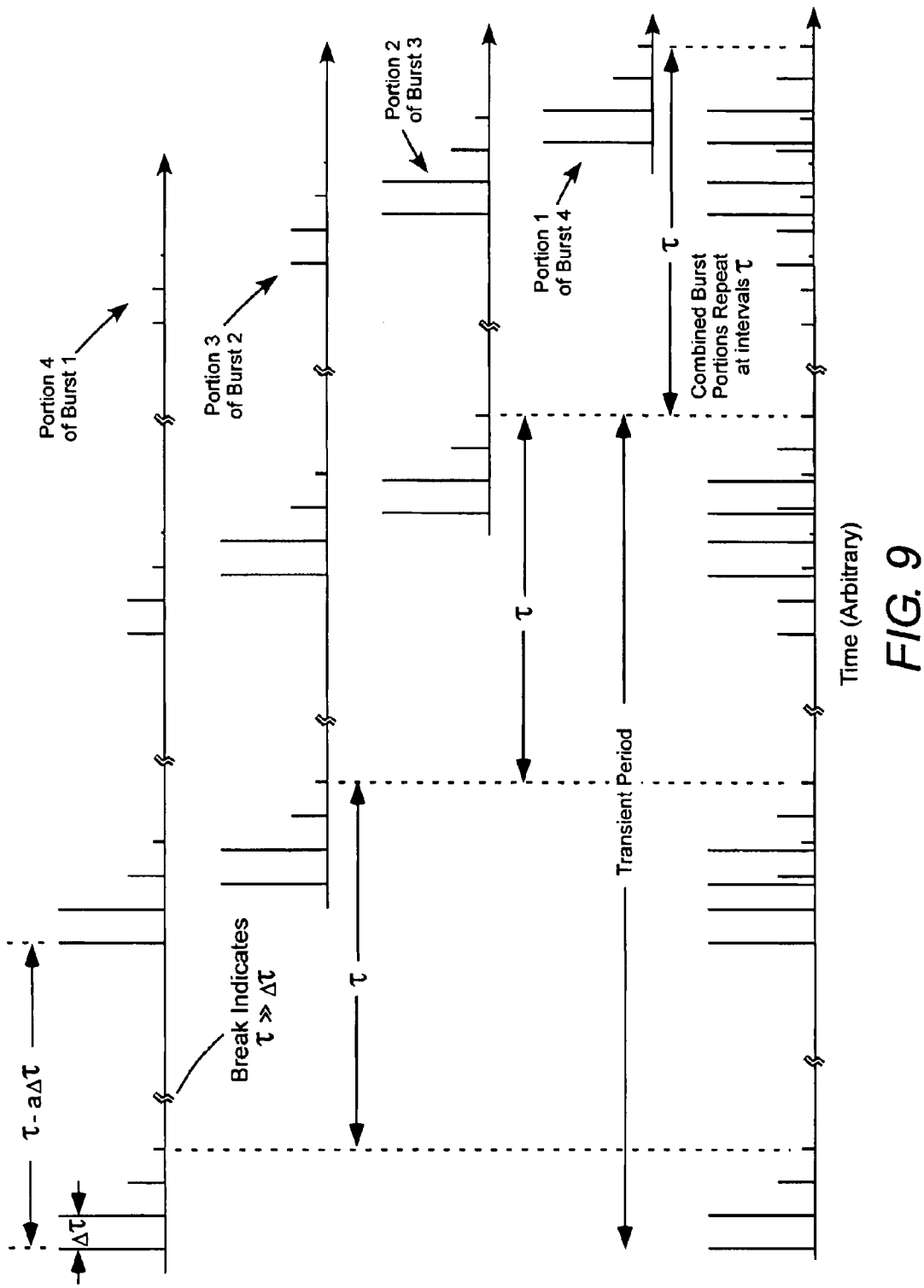
FIG. 9 is a timing diagram schematically illustrating division of bursts of harmonic-wavelength pulses into replicas thereof by an example of the second pulse-stretcher of FIG. 7 including a delay loop similar to the delay loop of FIG. 2 and recombination of replicas of different pulse-replica-bursts into longer bursts, with the first and second delay loops having a round-trip lengths respectively fractionally greater and fractionally less than twice the resonator-length of the mode-locked laser.

FIG. 9 is a timing diagram schematically illustrating division of bursts of harmonic-wavelength pulses into replicas thereof by an example of pulse-stretcher 19 of FIG. 7 including a delay loop similar to the delay loop of FIG. 2. Replicas of different pulse-replica-bursts are combined into longer bursts as described above with reference to FIG. 8. In the timing diagram of FIG. 9, however, the delay loops of pulse-stretchers 16 and 19 are assumed to have round-trip lengths respectively fractionally greater and fractionally less than the round-trip resonator-length L of the mode-locked laser. A result of this is that, in combined burst-portions at the output of pulse-stretcher 19, pulse-replicas having the highest peak-power are located in the center of the combination of bursts with replicas having lower power ahead of and behind these highest-peak-power replicas, as indicated in the bottom line of the timing diagram of FIG. 9.

In the discussion presented above, the importance of avoiding temporal overlap of pulse-replicas is discussed in the context of avoiding interference. In cases where polarization of radiation delivered to a target is not important, it is possible to cause some replicas in a burst thereof to be plane-polarized in a first orientation, and others to be plane-polarized in a second orientation perpendicular to the first orientation. If a pulse-replica plane-polarized in the first orientation temporally overlaps a pulse-replica plane-polarized in the second orientation the replicas will not interfere.

Figure 7A:
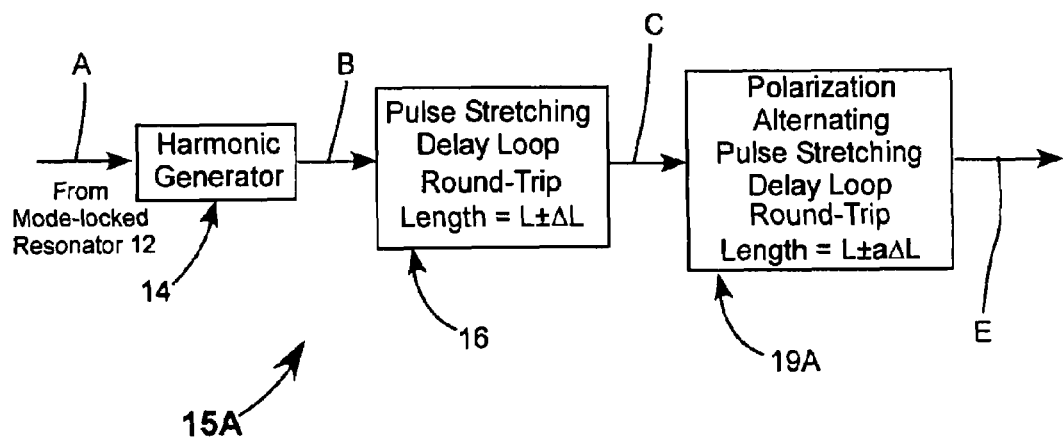
FIG. 7A schematically illustrates a variation of the apparatus of FIG. 7 wherein the second pulse-stretcher alternates the polarization of radiation circulating therein on successive round trips therein.
Figure 7B:
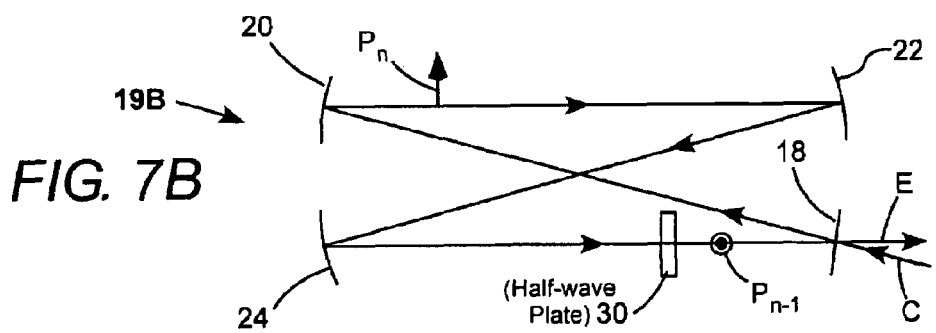
FIG. 7B schematically illustrates a delay loop suitable for the second pulse-stretcher of the apparatus of FIG. 7A, similar to the delay loop of FIG. 2, but including a half-wave plate arranged such that sequential burst-replicas generated in the delay loop are plane-polarized perpendicular to each other.

One means of effecting alternate polarization of replicas is depicted in FIG. 7A. Here a second pulse-stretcher 19A is configured such that the polarization of radiation circulating therein is rotated by 90 degrees on successive round-trips of the delay loop. FIG. 7B schematically illustrates one example 19B of a delay loop for effecting this polarization rotation. Delay loop 19A is similar to the delay loop of FIG. 2 with an exception that a half-wave (at the wavelength of the harmonic-wavelength pulses) plate 30 is included in the path of radiation in the loop. If radiation circulating in the resonator is vertically polarized on a nth round trip as indicated in FIG. 7B by arrow Pn, the radiation will be horizontally polarized on an (n+1)th round trip as indicated by arrowhead $P_{n+1}$.

In this arrangement, it is recommended that the delay loop be configured such that the angle of incidence on beamsplitter 18 be as near normal as is practical. This will minimize the reflectivity difference on the beamsplitter for the different polarization-orientations.

However, at an angle sufficiently different from normal, for example about 45°, a beamsplitter can be designed that has a predetermined polarization-dependence of reflectivity, with this dependence used as an additional variable for tailoring the relative intensity of replicas output by the delay loop.

By way of example, if the beamsplitter in a lossless loop has a reflectivity for the input polarization-orientation of about 29.289% and a reflectivity of about 58.578% for a polarization-orientation perpendicular to the input polarization-orientation, then the first three replicas will have a relative intensity of 0.29289 and the fourth replica and fifth replicas will have a relative intensity of only 0.0502. The sixth replicas will have a relative intensity of about 0.008. There will be about 88% of the input pulse energy in the first three replicas. The peak-intensity in a burst of replicas will be about 25% less than would be the case for an optimized loop without polarization dependence.

For real (lossy) conditions the two reflectivity values ($R_P$ and $R_S$) can be approximated by equations:

$$R_P = \frac{1 + \frac{1}{T} + 2T - \frac{\sqrt{1 + 2T + 5T^2}}{T}}{2(1 + T)} \quad (4)$$

and $$R_S = \frac{1 + 3T - \sqrt{1 + 2T + 5T^2}}{2T} \quad (5)$$

where T is 1.0 minus the round trip loss, and $R_P$ has the lower of the two values.

Figure 9A:
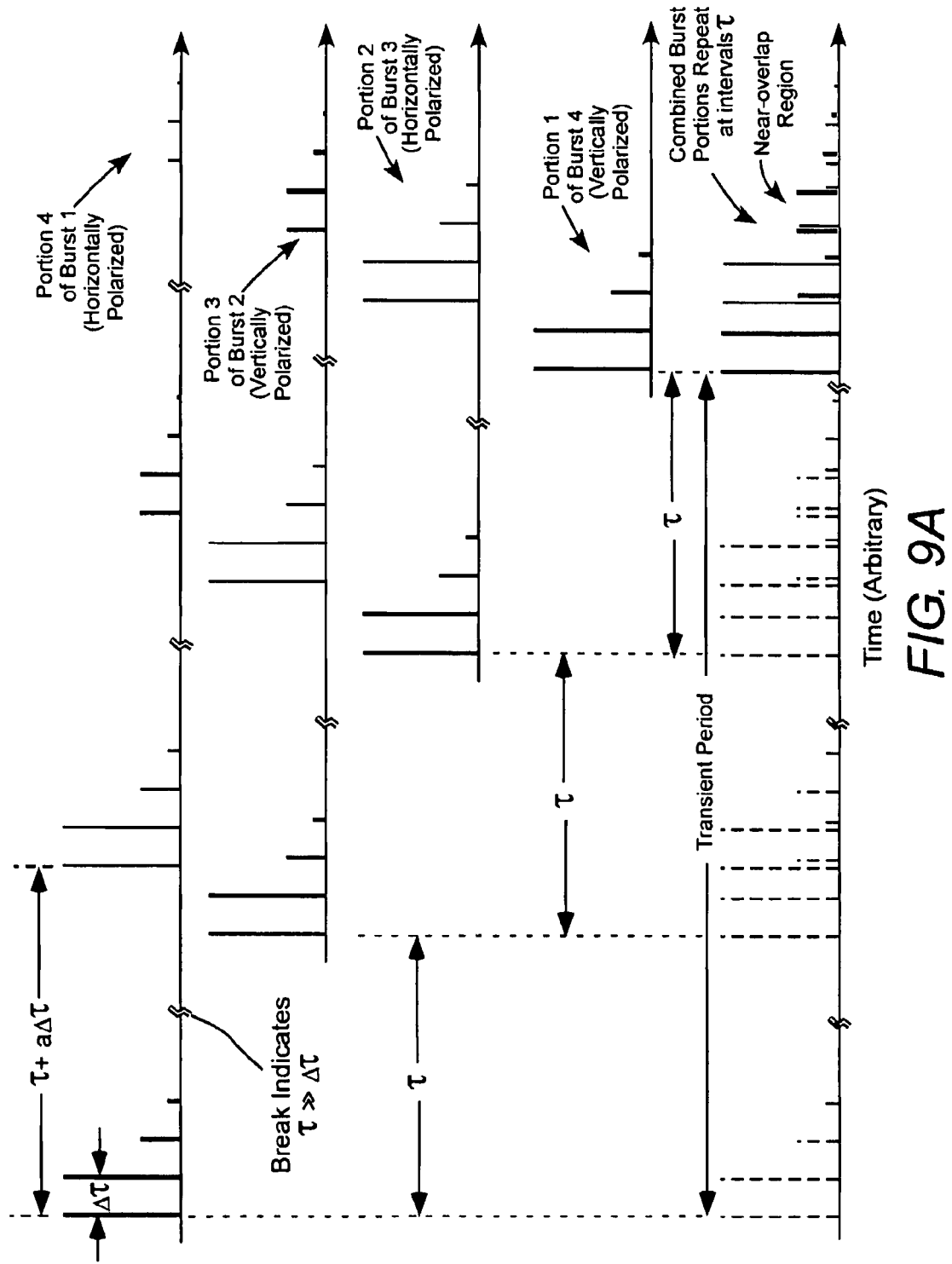
FIG. 9A is a timing diagram schematically illustrating division of bursts of harmonic-wavelength pulses into replicas thereof by an example of the second pulse-stretcher of FIG. 7A including a delay loop similar to the delay loop of FIG. 7B and recombination of horizontally and vertically polarized replicas of different pulse-replica-bursts into longer bursts, with the first and second delay loops each having a round-trip length fractionally greater than twice the resonator-length of the mode-locked laser.

FIG. 9A is a timing diagram schematically illustrating division of bursts of harmonic-wavelength pulses into replicas thereof by an example of the second pulse-stretcher including a delay loop similar to the delay loop of FIG. 7B and recombination of horizontally and vertically polarized replicas of different pulse-replica-bursts into longer bursts. In FIG. 9A, vertically polarized pulse-replicas are designated by bold lines and horizontally-polarized pulse-replicas are designated by fine lines. Odd-numbered portions of pulse-bursts created by the second pulse-stretcher from a burst of pulses received from the first stretcher are assumed to be vertically polarized. Even-numbered burst-portions are assumed to be horizontally polarized. In a burst of replicas at the output of the second-pulse-stretcher the most closely temporally spaced replicas are plane-polarized perpendicular to each other. Those skilled in the art will recognize without further detailed description or illustration that a half-wave plate could be incorporated in the first pulse-stretcher such that odd and even numbered pulse-replicas were plane-polarized perpendicular to each other.

FIGS. 9B-D are graphs schematically illustrating computed relative intensity as a function of time in a burst of replicas of hypothetical sech-squared pulses from the second pulse-stretcher of the apparatus of FIG. 7A wherein the first pulse-stretcher has a delay loop similar to the delay loop of FIG. 2 and the second pulse-stretcher has a delay loop similar to the delay loop of FIG. 7B. The first pulse-stretcher is assumed to have a round-trip time equal to a pulse-repetition period of the harmonic-wavelength pulses plus six-times the pulse-duration of the harmonic-wavelength pulses. The second pulse-stretcher (the polarization alternating stretcher) is assumed to have a round-trip time equal to a pulse-repetition period of the harmonic-wavelength pulses minus five-times the pulse-duration of the harmonic-wavelength pulses. Odd and even numbered burst-portions generated by delay loop 19B are assumed to be respectively vertically and horizontally polarized. The beamsplitter in the polarization alternating stretcher is assumed to have the same reflectivity for each polarization state. Other assumptions are the same as those of the computation of FIG. 8A.

FIGS. 9B and 9C graphically depict respectively the sum of vertically-polarized pulse-replicas and the sum of horizontally polarized replicas (curves V and H respectively) at the output of the second pulse-stretcher. In each case, the temporally closest-spaced pulse-replicas are separated by at least about two pulse-durations and also have very different peak-power, such that the difference between any constructive and destructive interference will be negligible.

FIG. 9D graphically depicts the sum of the horizontally and vertically polarized sums. Here, there are three central peak components formed by temporally overlapping vertical and horizontally polarized components. There will, accordingly, not be any interference in these peaks It is evident from the above described examples that arranging two of the inventive pulse-stretchers "cascaded" in optical series, and using available variables such as positive and "negative" delay, different delay values, and overlapping pulse-replicas perpendicular to each other affords significant flexibility in tailoring the temporal energy deposition profile of a replica pulse-burst delivered by the second pulse-stretcher. Additional flexibility is possible by varying the reflectivity of the beamsplitters in the two pulse-stretchers.

In above-described embodiments of the invention, each pulse-stretcher has a round-trip delay that is fractionally different from the round-trip time of radiation in the mode-locked resonator, i.e., fractionally different from a pulse-repetition period $\tau$ of the mode-locked resonator. The fractional difference referred to here is less than a few percent of $\tau$. Variables discussed above can also be used to advantage in embodiments of the present invention wherein the inventive pulse-stretching delay loops have a round-trip delay-time that is fractionally different from a submultiple of the resonator round-trip time $\tau(\tau/N\pm\Delta\tau$, where N is an integer equal to or greater than 2) of the resonator. This is achieved by making the length of a delay loop about equal to $L/N\pm\Delta L$, where L as noted above, is the round-trip optical length of the resonator. In such embodiments the PRF of stretched harmonic-wavelength pulses is N times the PRF of the fundamental-wavelength pulses.

Figure 10:
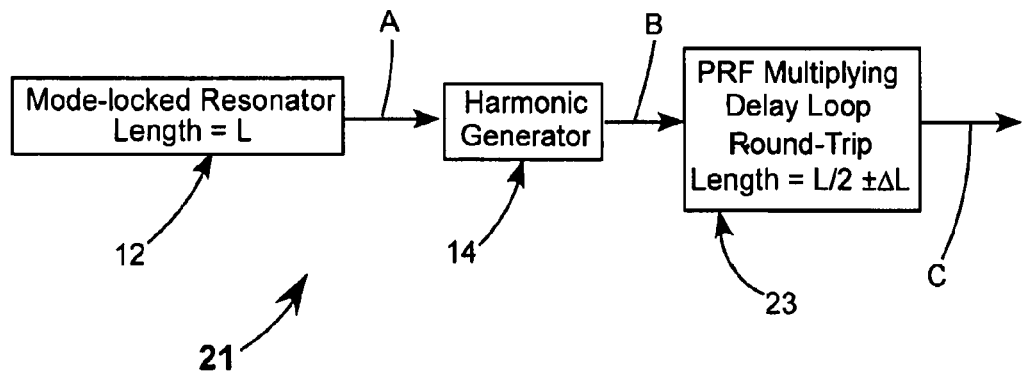
FIG. 10 schematically illustrates yet another preferred embodiment of laser apparatus in accordance with the present invention similar to the apparatus of FIG. 1 but wherein the pulse-stretcher includes an optical delay loop having a round-trip delay time fractionally different from one-half of the pulse-repetition period of the mode-locked resonator.

FIG. 10 schematically illustrates yet another preferred embodiment 21 of laser apparatus in accordance with the present invention that provides stretched harmonic-wavelength pulses at a PRF higher than that of the fundamental wavelength pulses. Apparatus 21 is similar to apparatus 10 of FIG. 1 with an exception that pulse-stretcher 16 of apparatus 10 is replaced in apparatus 21 by a pulse-stretcher 23 that includes a delay loop having a round-trip delay time of $\tau/2\pm\Delta\tau$, i.e., fractionally different from one-half of the round-trip time $\tau$ of mode-locked resonator 12. The round-trip time of mode-locked resonator 12 is, of course, equal to the pulse-repetition period of the resonator.

Figure 11:
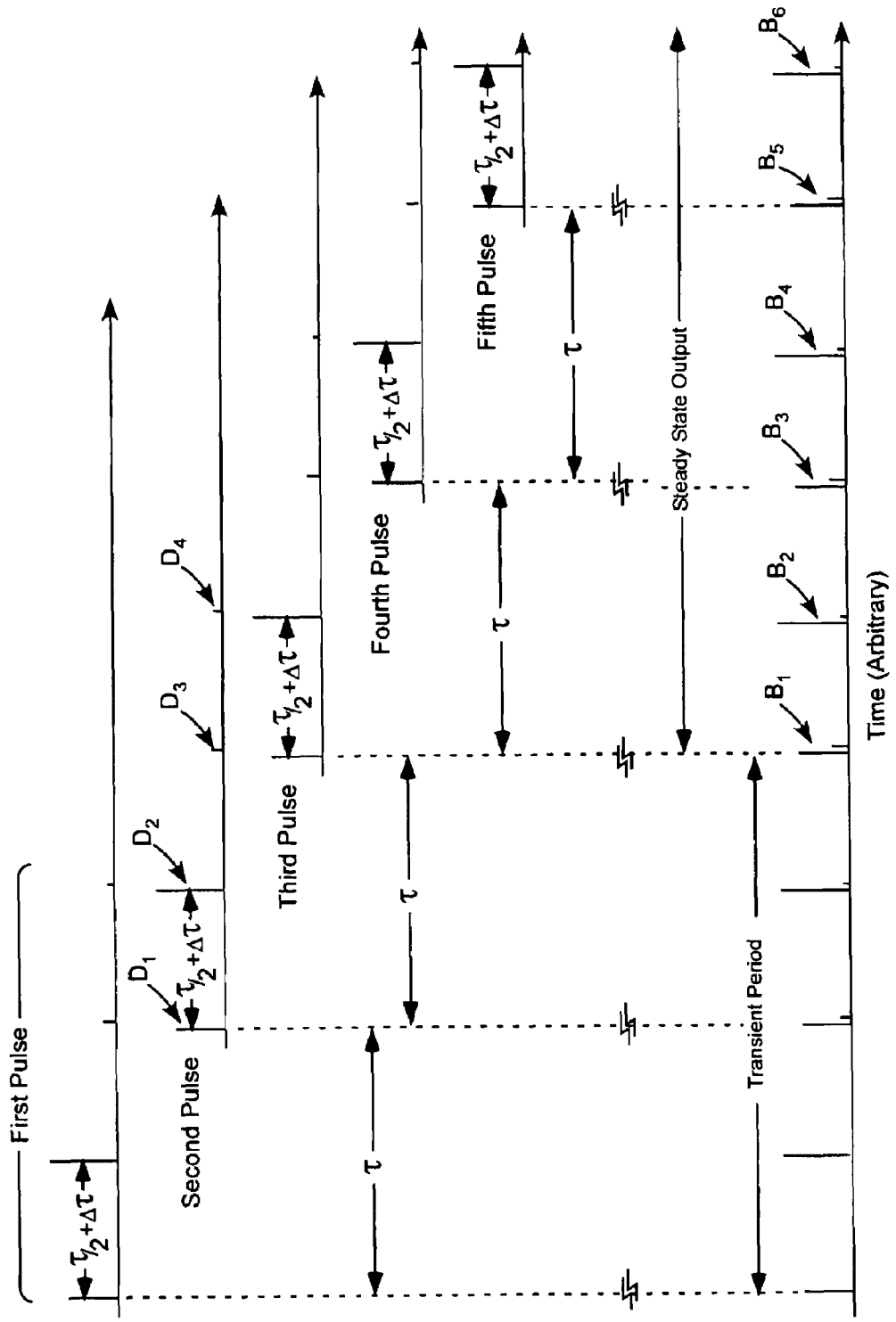
FIG. 11 is a timing diagram schematically illustrating generation of pulse-bursts in an example of the apparatus of FIG. 10.

FIG. 11 is a timing diagram schematically illustrating generation of pulse-bursts in an example of the apparatus of FIG. 10. Pulse-stretcher 23 divides each input pulse into replicas $D_1, D_2, D_3, D_4$, and so forth as discussed above. Here fifth and six replicas have too low a peak-power to be depicted and, accordingly, are neglected. The replicas of any pulse each have a different peak-power. In FIG. 11, the second replica of each pulse has a higher peak-power than the first replica for reasons that are discussed further hereinbelow. The third replica has a lower peak-power than the first replica, and the fourth replica has a lower peak-power than the third replica, as discussed above. The delay loop is assumed to have a round-trip delay time of $\tau/2+\Delta\tau$, and the replicas of each pulse are temporally spaced by this time-interval. The first replicas of successive pulses are temporally spaced by the pulse-repetition period $\tau$. The steady state output of pulse-stretcher 23, depicted on the bottom line of the timing diagram of FIG. 11, will comprise bursts of pulse-replicas $B_1, B_2, B_3, B_4, B_5$, and so forth, at a burst-repetition frequency that is twice the PRF of mode-locked resonator 12.

The bursts of pulse-replicas can be considered as "stretched" pulses repeated at twice the PRF of mode-locked resonator 12. The burst-repetition frequency can be considered as a stretched-pulse-repetition frequency.

In FIG. 11, as the fifth and higher replicas of each pulse are neglected, burst $B_1$ comprises the first replica of the third pulse and the third replica of the second pulse. Burst $B_2$ comprises the second replica of the third pulse and the fourth replica of the second pulse. Burst $B_3$ comprises the first replica of the fourth pulse and the third replica of the third pulse, and burst $B_4$ comprises the second replica of the third pulse and the fourth replica of the second pulse. Burst $B_3$ will actually also comprise the fifth replica (not shown) of the second pulse. Burst $B_4$ will actually also comprise the sixth replica (not shown) of the second pulse. Generally, in the steady state, an $n^{th}$ burst of replicas will comprise only even numbered pulse-replicas and an $(n+1)^{th}$ burst of replicas will comprise only odd numbered replicas, although any replica higher than the sixth will have vanishingly small peak-power, and can be neglected in most cases.

Now, in certain applications, it may be desirable that each burst of pulse-replicas (stretched pulse) have the same energy. This can be achieved by selecting a suitable value for beam-splitter 18 in the delay loop. Recognizing that equation (1) discussed above for computing the intensity of a particular transmitted replica defines a geometric progression having a common ration $R(1-A)$ and a scale factor $(1-A)(1-R)^2$, and defining $T=(1-A)$ the total intensity $I_{ODD}$ of odd-numbered replicas will be given by an equation:

$$I_{ODD} = R + \frac{(1-R)^2 RT^2}{1-R^2T^2} \tag{6}$$

and the total intensity $I_{EVEN}$ of even-numbered replicas will be given by an equation:

$$I_{EVEN} = \frac{(1-R)^2 T}{1-R^2T^2} \tag{7}$$

from which it can be determined that $I_{ODD}$ and $I_{EVEN}$ will be equal when:

$$R = \frac{T}{1+2T} \tag{8}$$

R will be ⅓ (33.333 . . . %) when the round-trip loss is zero (T=1). For a round-trip loss of 2% (T=0.98), R is about 33.108%. By way of example, this provides that the first, second, third, fourth, fifth, and sixth replicas of a pulse have relative peak-power (or peak-intensity) of, about, 0.331, 0.439, 0.142, 0.046, 0.015, and 0.005.

Similarly it can be determined that total loss $L_{TOTAL}$ is given by an equation:

$$L_{TOTAL} = \frac{(1-R)(1-T)}{1-RT} \tag{9}$$

and that the intensity I in each of the equal-energy bursts is given by an equation:

$$I = \frac{R}{1-RT} \quad (10)$$

where in each case R has been determined from equation (8). When T=1 (R=333.3333%) each of the equal energy bursts produced from an input pulse will have 50% of the energy of the input pulse.

In practice it is difficult to obtain, at least from commercial suppliers, beamsplitters having a reflectivity with one or two tenths of a percent of a specified value between about 30% and 40%. In cases where equal burst-energy is of critical importance, it may be found useful to configure beamsplitter 18 such that it has a selectively variable reflectivity. This can be done, for example, by providing a coating having a continuously graded reflectivity (from a value high than a desired value to a value lower than the desired value) over the surface of the beamsplitter, with either an angular or linear gradient, and correspondingly rotating or translating the beamsplitter in the input beam path until equal burst-energy is obtained. A method of producing graded reflectivity coatings is described in U.S. Pat. No. 5,993,904, assigned to the assignee of the present invention, and the complete disclosure of which is hereby incorporated by reference.

Figure 11A:
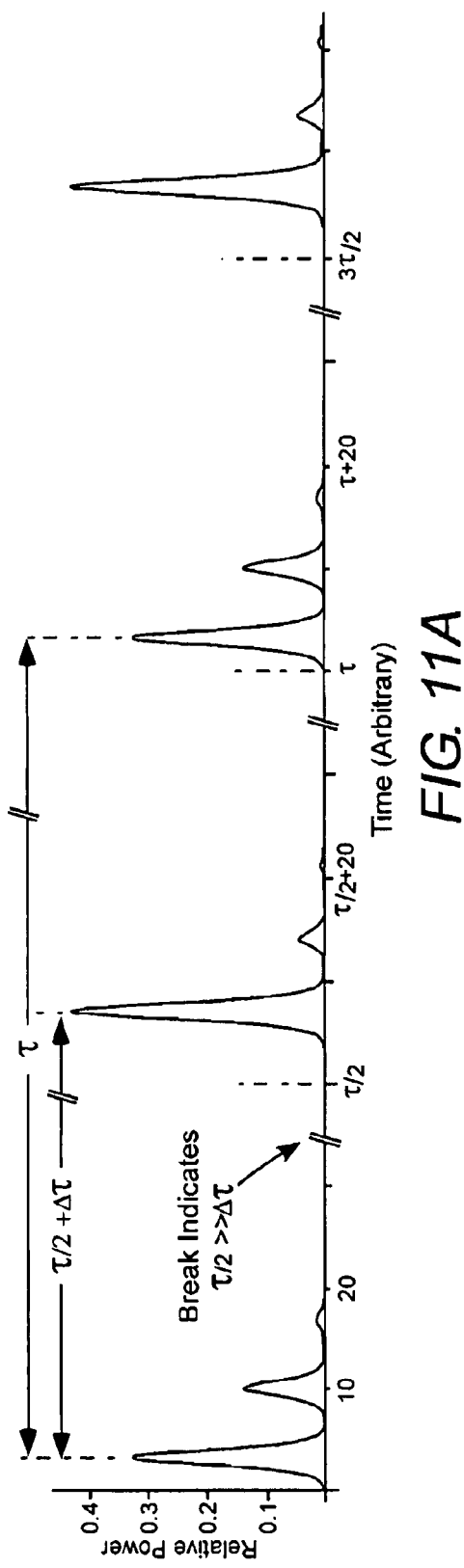
FIG. 11A is a graph schematically depicting detail of relative power as a function of time in four pulse-bursts generated in an example of the pulse-stretcher of FIG. 10.

FIG. 11A is graph schematically illustrating computed relative power as a function of time of a sequence of equal-energy bursts of pulse-replicas from pulse-stretcher 23 in which $\Delta\tau$ is adjusted to provide a spacing of four pulse-durations between replicas. The time axis is greatly foreshortened to allow detail of the pulse-replicas to be depicted. Of note, here, is that while there are two bursts per repetition-period, the bursts are not temporally, exactly equally spaced. The temporal spacing of the bursts alternates between $\tau/2+\Delta\tau$ and $\tau/2-\Delta\tau$. As already noted, however, $\Delta\tau$ will usually be less than about 1% of $\tau$.

Figure 10A:
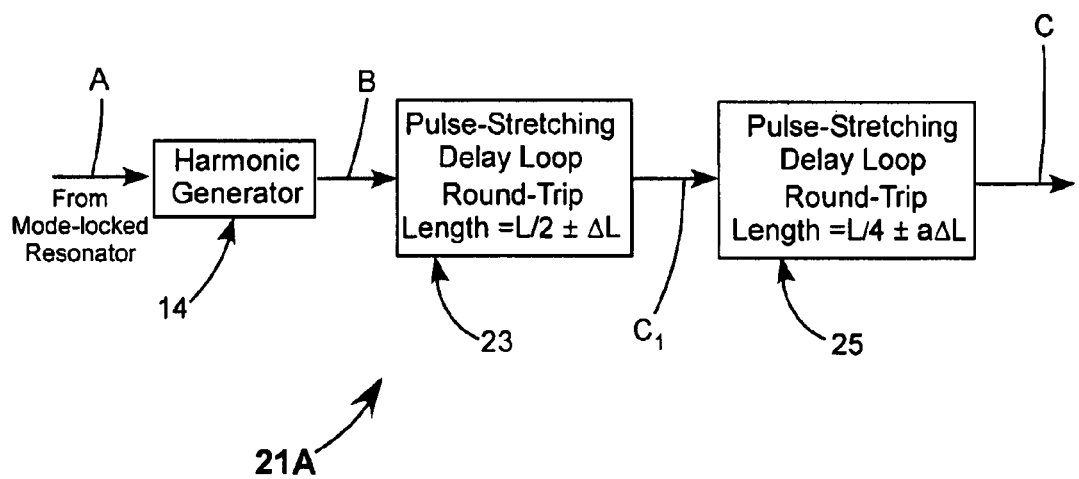
FIG. 10A schematically illustrates still another preferred embodiment of laser apparatus in accordance with the present invention, similar to the apparatus of FIG. 7 but wherein the first pulse-stretcher includes an optical delay loop having a round-trip delay time fractionally different from one-half of the pulse-repetition period of the mode-locked resonator, and the second pulse-stretcher includes an optical delay loop having a round-trip delay time fractionally different from one-quarter of the pulse-repetition period of the mode-locked resonator.

FIG. 10A schematically illustrates still another preferred embodiment 21A of laser apparatus in accordance with the present invention similar to the apparatus of FIG. 10 but wherein the output of pulse-stretcher 23 is directed along a path $C_1$ into a second pulse-stretcher 25 having a round-trip length $L/4+a\Delta L$ corresponding to a round-trip delay-time $\tau/4+a\Delta\tau$. The action of pulse-stretcher 25 is depicted, in timing diagram form, in FIG. 11B.

Each burst from pulse-stretcher 23 is divided into portions in pulse-stretcher 25. In FIG. 11B, odd-numbered burst-portions are designated $O_1$, $O_2$, $O_3$, and $O_4$, with higher numbered portions $O_5$, $O_6$, and so forth, not visible on the scale of the diagram. Even-numbered burst-portions are designated $E_1$, $E_2$, $E_3$, and $E_4$, again, with higher numbered portions $E_5$, $E_6$, and so forth, also not visible on the scale of the diagram. In the output channel C of pulse-stretcher 25, the bottom line of FIG. 1B, there is a repeated series of four sequences or bursts of pulse-replicas. Each series includes sequences $S_1$, $S_2$, $S_3$, and $S_4$. These are delivered in a time period $\tau$, such that the sequence repetition rate is four-times the pulse repetition rate of the mode-locked resonator. In the steady state, in general terms, $S_1$ comprises the $1^{st}$ portion of the $(n+1)^{th}$ burst from pulse-stretcher 23, the $3^{rd}$ portion of the nth burst, the $5^{th}$ portion of the $(n-1)^{th}$ burst, and so forth. $S_2$ comprises the $2^{nd}$ portion of the $(n+1)^{th}$ burst, the $4^{th}$ portion of the $n^{th}$ burst, the $6^{th}$ portion of the $(n-1)^{th}$ burst, and so forth. $S_3$ comprises the $1^{st}$ portion of the $(n+2)^{th}$ burst, the $3^{rd}$ portion of the $(n+1)^{th}$ burst, the $5^{th}$ portion of the $n^{th}$ burst, and so forth. $S_4$ comprises the $2^{nd}$ portion of the $(n+2)^{th}$ burst, the $4^{th}$ portion of the $(n+1)^{th}$ burst, the $6^{th}$ portion of the $n^{th}$ burst, and so forth.

Figure 11C:
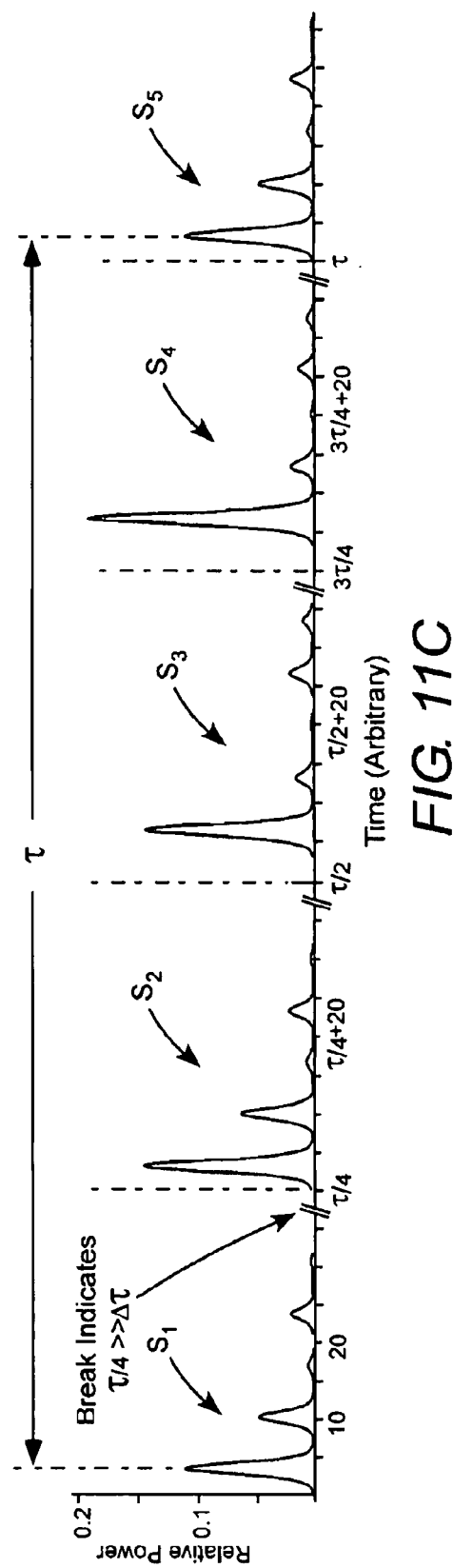
FIG. 11C is a graph schematically depicting detail of relative power as a function of time in five pulse-sequences generated in an example of the second pulse-stretcher of FIG. 10A from equally-energy input bursts from the first pulse-stretcher of FIG. 10A.
Figure 11B:
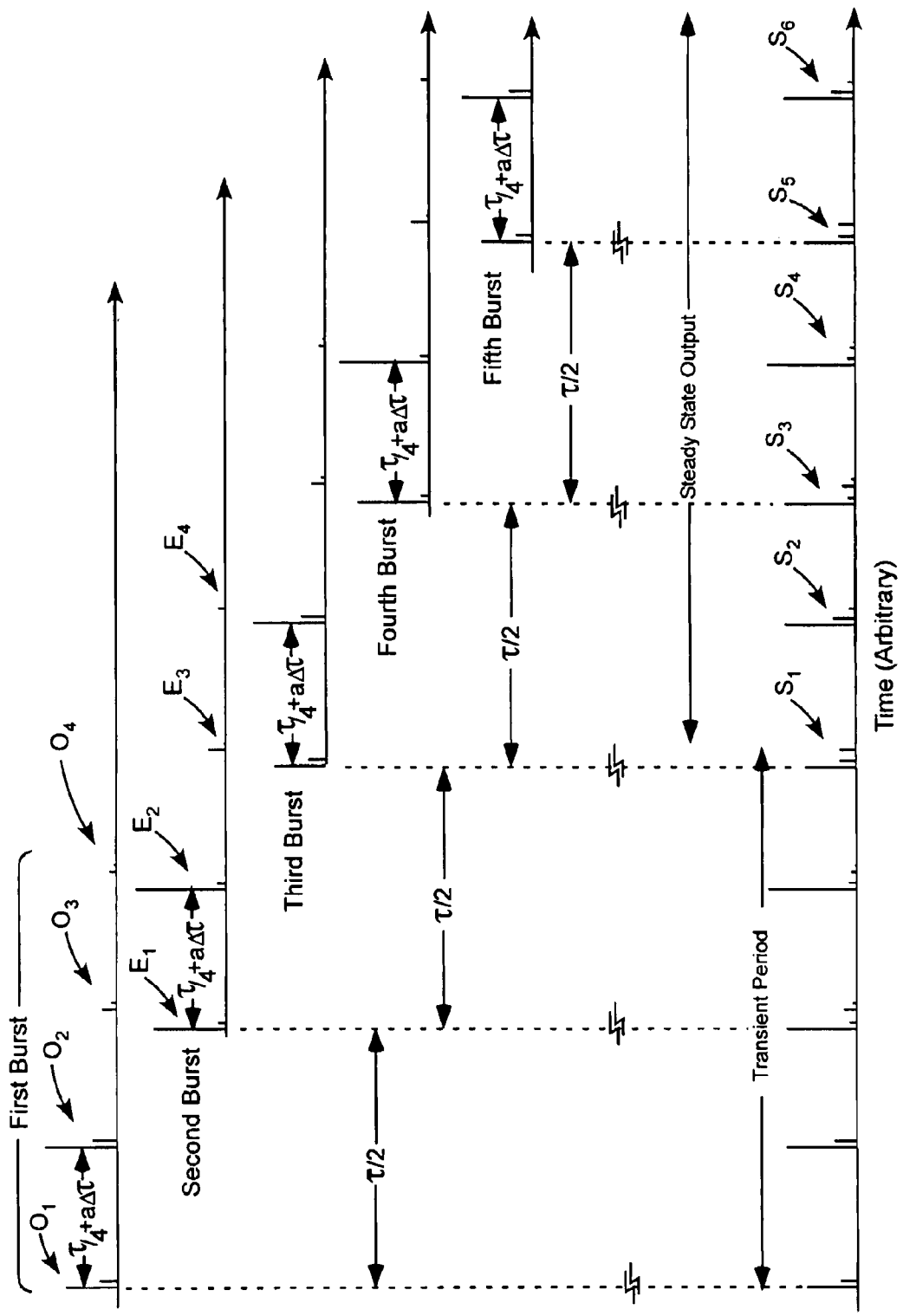
FIG. 11B is a timing diagram schematically illustrating generation of pulse sequences in an example of the apparatus of FIG. 10A.

FIG. 11C is a graph schematically illustrating detail of computed relative power as a function of time for five pulse-sequences in the timing diagram of FIG. 11B. As in FIG. 11A, the time-axis is greatly foreshortened to allow detail of the pulse-replicas to be depicted. It is assumed in this computation that pulse-replicas in the input bursts are spaced apart by $\Delta\tau$ equal to four pulse-durations and that the value $a\Delta\tau$ is sixteen pulse-durations. It is also assumed that the input to pulse-stretcher 25 is replica-bursts of equal energy as discussed above. It is further assumed that the round-trip loss in each of the pulse-stretchers is 0.02, and that the reflectivity of the beamsplitter in each of the pulse-stretchers is about 33.1%, i.e., that value which provides the equal-energy bursts from pulse-stretcher 23. Those having sufficient patience to compute the energy in each of the four sequences $S_1$-$S_4$ will find that each sequence has about the same energy, even though each comprises a different set of replicas from those comprised by any other. As in the case of pulse-stretcher 23, the sequences are not temporally, exactly equally spaced, but can be described as being about equally spaced.

The present invention is described above in terms of particular embodiments. Certain embodiments are arranged to deliver bursts of harmonic-wavelength pulse-replicas with temporal separation of pulses in the burst being only a relatively small fraction of the temporal separation of the pulses bursts. Although the invention is described in terms of generating the harmonic-wavelength pulse-replicas by extra-cavity frequency-conversion of fundamental-wavelength optical pulses, principles of the invention are also applicable to generating bursts of pulse-replicas of harmonic-wavelength pulses from an intra-cavity frequency-converted laser-resonator and even to generating bursts of fundamental wavelength pulses or frequency-converted pulses of a non-harmonic wavelength such are generated in the resonator of an optical parametric oscillator.

Those skilled in the art may devise other embodiments of the present invention combining features from the above-described embodiments with out departing from the spirit and scope of the present invention. Accordingly it is emphasized that the present invention is not limited to the embodiments described and depicted herein. Rather, the invention is limited only by the claims appended hereto.

What is claimed is:

1. Laser apparatus comprising:

a laser source providing optical pulses having a first wavelength and being temporally equispaced by a pulse-repetition period $\tau$ and delivered at a pulse-repetition frequency (PRF) equal to $1/\tau$; and a first optical delay loop arranged to receive the first-wavelength optical pulses and divide each thereof into first through $M^{th}$ replicas thereof with the replicas of each pulse being temporally spaced apart by $\tau/N\pm\Delta\tau$, where N is an integer equal to or greater than 1 and $\Delta\tau$ is about equal to or greater than the pulse-duration of the first-wavelength optical pulses, the optical delay loop being further arranged to deliver bursts of the pulse-replicas at a burst-repetition frequency equal to the PRF of the optical pulses multiplied by N, with each burst including replicas of different ones of the first-wavelength optical pulses.

2. The apparatus of claim 1, wherein the PRF of the first-wavelength optical pulses is greater than about 10 MHz and the pulse-duration of the first-wavelength optical pulses is less than about 100 picoseconds.

3. The apparatus of claim 1, wherein the laser source includes a laser delivering optical pulses having a fundamental-wavelength different from the first wavelength, and a wavelength converter arranged to receive the fundamental-wavelength optical pulses and convert the fundamental-wavelength optical pulses to the first-wavelength optical pulses.

4. The apparatus of claim 1, wherein the wavelength converter is a harmonic generator and the first-wavelength is a second or higher harmonic-wavelength of the fundamental wavelength.

5. The apparatus of claim 1, wherein N is 2, whereby the burst-repetition frequency is twice the PRF of the first-wavelength optical pulses.

6. The apparatus of claim 1, further including a second optical delay loop arranged to receive replica-bursts from the first optical delay loop and arranged to divide each of the replica-bursts into first through $M^{th}$ replicas thereof with the replicas of each replica-burst being temporally spaced apart by $\tau/U \pm a\Delta\tau$, where U is an integer equal to or greater than 1 and $a\Delta\tau$ is about equal to or greater than the pulse-duration of the first-wavelength optical pulses, the second optical delay loop being further arranged to deliver sequences of burst-replicas at a sequence-repetition frequency equal to the PRF of the first-wavelength optical pulses multiplied by N×U, with each sequence including replicas of different ones of the first-wavelength optical pulse-bursts.

7. The apparatus of claim 6, wherein N is 2, and U is 4, whereby the sequence-repetition frequency is four-times the PRF of the first-wavelength optical pulses.

8. The apparatus of claim 7, wherein the sequences of pulse-burst replicas have about equal energy.

9. The apparatus of claim 6, wherein the first wavelength optical pulse-bursts have about equal energy.

10. The apparatus of claim 1, wherein the optical wavelength pulses are plane-polarized in a first polarization-orientation and the first optical delay loop is configured and arranged such that odd numbered replicas in the bursts of thereof delivered by the first optical delay loop are plane-polarized in the first polarization-orientation, and even numbered replicas in the bursts of thereof delivered by the first optical delay loop are plane-polarized in a second orientation perpendicular to the first orientation.

11. The apparatus of claim 10, wherein the delay loop is further configured and arranged such that the first, second, and third replicas in any burst thereof have about equal intensity.

12. Laser apparatus comprising:
 a laser-resonator arranged to deliver fundamental-wavelength optical pulses having a pulse-duration, the fundamental-wavelength optical pulses being temporally equispaced by a pulse-repetition period $\tau$ and delivered at a pulse-repetition frequency (PRF) equal to $1/\tau$;
 a harmonic-generator arranged to receive the fundamental-wavelength optical pulses and convert the fundamental-wavelength optical pulses into harmonic-wavelength pulses at the PRF of the fundamental-wavelength optical pulses; and
 a first optical delay loop arranged to receive the harmonic-wavelength optical pulses and divide each thereof into first through $M^{th}$ replicas thereof with the replicas of each pulse being temporally spaced apart by $\tau/N \pm \Delta\tau$, where N is an integer equal to or greater than 1 and $\Delta\tau$ is about equal to or greater than the pulse-duration of the fundamental-wavelength optical pulses, the optical delay loop being further arranged to deliver bursts of the harmonic-wavelength pulse-replicas at a burst-repetition frequency equal to the PRF of the fundamental-wavelength optical pulses multiplied by N, with each burst including replicas of different ones of the harmonic-wavelength optical pulses.

13. The apparatus of claim 12, wherein the PRF of the fundamental wavelength pulses is greater than about 10 MHz and the pulse-duration of the fundamental wavelength optical pulses is less than about 100 picoseconds.

14. The apparatus of claim 12, wherein N=2, $\Delta\tau$ is positive, and wherein odd-numbered ones of the replica-bursts delivered by the optical delay loop include the first replica of a $Q^{th}$ pulse, the third replica of the $(Q-2)^{th}$ pulse, the fifth replica of the $(Q-4)^{th}$ pulse, and even-numbered ones of the bursts include the second replica of the $(Q-1)^{th}$ pulse, the fourth replica of the $(Q-3)^{th}$ pulse, and the sixth replica of the $(Q-5)^{th}$ pulse.

15. The apparatus of claim 14, wherein the optical delay loop is configured such that odd and even numbered ones of the replica-bursts have about the same total energy.

16. The apparatus of claim 15, further including a second optical delay loop arranged to receive replica-bursts from the first optical delay loop and arranged to divide each of the replica-bursts into first through $M^{th}$ replicas thereof with the replicas of each replica-burst being temporally spaced apart by $\tau/U \pm a\Delta\tau$, where U is an integer equal to or greater than 1 and $a\Delta\tau$ is about equal to or greater than the pulse-duration of the fundamental-wavelength optical pulses, the second optical delay loop being further arranged to deliver sequences of burst-replicas at a sequence-repetition frequency equal to the PRF of the fundamental-wavelength optical pulses multiplied by N×U, with each sequence including replicas of different ones of the harmonic-wavelength optical pulse-bursts.

17. The apparatus of claim 11, wherein the harmonic-wavelength pulses are plane-polarized in a first polarization-orientation and the first optical delay loop is configured and arranged such that odd numbered replicas in the bursts of thereof delivered by the first optical delay loop are plane-polarized in the first polarization-orientation, and even numbered replicas in the bursts of thereof delivered by the first optical delay loop are plane-polarized in a second orientation perpendicular to the first orientation.

18. The apparatus of claim 17, wherein the delay loop is further configured and arranged such that the first, second, and third replicas in any burst thereof have about equal intensity.

19. The apparatus of claim 12, wherein the optical delay loop includes a plane beamsplitter arranged to reflect a first portion of an input beam to provide a first pulse-replica propagating on a first path, and to transmit the remainder of the beam into the delay loop, the delay loop further including a plurality of optical elements arranged to relay-image the beam transmitted by the beamsplitter after a first round-trip in the delay loop back onto the beam splitter, with unit magnification, at a position thereon from which the first replica was reflected.

20. The apparatus of claim 19 wherein the beamsplitter and the optical elements are configured and arranged such that the beamsplitter transmits a portion of the beam imaged thereon to provide a second pulse-replica propagating on the same path as the first pulse-replica and reflects another portion of the beam imaged thereon back around the delay loop to be re-imaged on the beamsplitter with unit magnification in the same position thereon.

21. The apparatus of claim 20, wherein the beamsplitter has a reflectivity selected such that the first replica and the second replica of the input pulse have about the same intensity.

22. The apparatus of claim 12, wherein the optical delay loop includes a plane beamsplitter arranged to reflect a first portion of an input beam to provide a first pulse-replica propagating on a first path, and to transmit the remainder of the beam into the delay loop, the delay loop further including a plurality of optical elements arranged to relay-image the beam transmitted by the beamsplitter after a first round-trip in the delay loop back onto the beam splitter, with unit magnification, at a second position thereon spaced apart from the first position thereon from which the first replica was reflected.

23. The apparatus of claim 22, wherein the beamsplitter and the optical elements are further configured and arranged such that the beamsplitter transmits a portion of the beam imaged at the second position thereon to provide a second pulse-replica propagating on second a path parallel to and spaced apart from the first path and reflects another portion of the beam imaged thereon back around the delay loop to be re-imaged on the beamsplitter with unit magnification at a third position thereon spaced apart from the first and second positions, with a third pulse-replica being transmitted by the beamsplitter along a third path parallel to and spaced apart from the first and second paths.

24. The apparatus of claim 23, wherein the reflectivity of the beamsplitter at the first position thereon is different from the reflectivity at the second position thereon, and the reflectivity at the third position thereon is different from the reflectivity at the first and second positions thereon, and wherein the beamsplitter reflectivities at the first, second and third positions thereon are selected such that the first, second, and third pulse-replicas have about equal intensity.

25. The apparatus of claim 12, wherein the delay loop includes a beamsplitter and wherein a first of the M replicas of an input harmonic-pulse is provided by a portion of that input pulse being reflected from the beamsplitter, with the second through Mth pulse-replicas being transmitted through the beamsplitter following respectively $1^{st}$ through $(M-1)^{th}$ round trips of a transmitted remainder of the input pulse in the delay loop.

26. The apparatus of claim 25, wherein the harmonic-wavelength pulses are plane-polarized and the delay-loop includes an optical device for rotating the polarization-plane of the remainder of the input pulse by 90 degrees on each of the round trips in the delay loop, with the polarization-rotating device being positioned such that odd-numbered ones of the pulse-replicas are polarized in the plane of the input pulse and even-numbered pulse-replicas are polarized in a plane perpendicular to the plane of the input pulse.

27. Laser apparatus comprising:
a laser-resonator arranged to deliver fundamental-wavelength optical pulses having a pulse-duration, the fundamental-wavelength optical pulses being temporally equispaced by a pulse-repetition period $\tau$ and delivered at a pulse-repetition frequency (PRF) equal to $1/\tau$;
a harmonic generator arranged to receive the fundamental-wavelength optical pulses and convert the fundamental-wavelength optical pulses into harmonic-wavelength pulses at the PRF of the fundamental-wavelength optical pulses;
a first optical delay loop arranged to receive the harmonic-wavelength optical pulses and divide each thereof into a plurality of replicas thereof with the replicas of each pulse being temporally spaced apart by $\tau/2 \pm \Delta\tau$, where $\Delta\tau$ is about equal to or greater than the pulse-duration of fundamental-wavelength optical pulses, the optical delay loop being further arranged to deliver bursts of the harmonic-wavelength pulse-replicas at a burst-repetition frequency equal to twice the PRF of the fundamental-wavelength optical pulses with each burst including replicas of different ones of the harmonic-wavelength optical pulses.

28. The apparatus of claim 27, wherein the first optical delay loop is further arranged such that the bursts of the harmonic-wavelength pulse-replicas have about equal energy.

29. The apparatus of claim 27, further including a second optical delay loop arranged to receive replica-bursts from the first optical delay loop and arranged to divide each of the replica-bursts into a plurality of replicas thereof with the replicas of each replica-burst being temporally spaced apart by $\tau/4 \pm a\Delta\tau$, where $a\Delta\tau$ is about equal to or greater than the pulse-duration of the fundamental-wavelength optical pulses, the second optical delay loop being further arranged to deliver sequences of burst-replicas at a sequence-repetition frequency equal to four times the PRF of the fundamental-wavelength optical pulses.

30. The apparatus of claim 29, wherein the first and second optical delay loops are configured such that the sequences of burst-replicas have about equal energy.

* * * * *